US012618540B2

(12) United States Patent
Ward

(10) Patent No.: US 12,618,540 B2
(45) Date of Patent: May 5, 2026

(54) CUSTOMIZABLE MODULAR LIGHTING SAFETY SYSTEM

(71) Applicant: Kelly E Ward, Sandown, NH (US)

(72) Inventor: Kelly E Ward, Sandown, NH (US)

( * ) Notice: Subject to any disclaimer, the term of this patent is extended or adjusted under 35 U.S.C. 154(b) by 0 days.

(21) Appl. No.: 19/075,044

(22) Filed: Mar. 10, 2025

(65) Prior Publication Data

US 2025/0305653 A1 Oct. 2, 2025

Related U.S. Application Data

(63) Continuation of application No. 29/935,673, filed on Apr. 3, 2024, now abandoned, and a continuation of application No. 29/934,629, filed on Mar. 27, 2024, now abandoned.

(60) Provisional application No. 63/566,908, filed on Mar. 19, 2024.

(51) Int. Cl.

| | |
|---|---|
| ***F21S 45/50*** | (2018.01) |
| ***F21S 2/00*** | (2016.01) |
| ***F21V 23/00*** | (2015.01) |
| ***F21V 23/06*** | (2006.01) |
| ***F21V 33/00*** | (2006.01) |
| ***F21W 107/10*** | (2018.01) |
| ***F21Y 115/10*** | (2016.01) |

(52) U.S. Cl.

CPC ............... *F21S 45/50* (2018.01); *F21S 2/005* (2013.01); *F21V 23/002* (2013.01); *F21V 23/06* (2013.01); *F21V 33/0076* (2013.01); *F21W 2107/10* (2018.01); *F21Y 2115/10* (2016.08)

(58) Field of Classification Search

CPC ......... F21S 2/00–005; F21S 41/19–198; F21S 45/50; F21V 23/00–002; F21V 23/06; F21V 33/0076; F21W 2107/10; F21Y 2115/10

See application file for complete search history.

(56) References Cited

U.S. PATENT DOCUMENTS

| | | | |
|---|---|---|---|
| 4,935,665 | A | 6/1990 | Murata |
| 5,101,326 | A | 3/1992 | Roney |
| 6,623,151 | B2 | 9/2003 | Pederson |
| 7,407,304 | B2 | 8/2008 | Tasson |
| 7,665,862 | B2 | 2/2010 | Villard |
| 7,740,366 | B2 | 6/2010 | Tetsuo |
| 7,929,142 | B2 | 4/2011 | Ben-Ezra |
| 9,303,846 | B2 | 4/2016 | Chinniah |
| 9,464,772 | B2 | 10/2016 | O'Brien |
| RE46,220 | E | 11/2016 | Georgitsis et al. |
| 10,190,740 | B2 | 1/2019 | Arita |
| 10,502,407 | B1 | 12/2019 | Spiro |
| 10,551,546 | B2 | 2/2020 | Fattal |

(Continued)

FOREIGN PATENT DOCUMENTS

| | | | |
|---|---|---|---|
| CN | 217273895 | U | 8/2022 |
| KR | 20110088130 | A | 8/2011 |
| KR | 20110097328 | A | 8/2011 |

*Primary Examiner* — Jason M Han

(74) *Attorney, Agent, or Firm* — Patent Negotiator, PLLC; Sarita L. Pickett

(57) ABSTRACT

The invention is a modular safety lighting system for use on vehicles, such as cars, emergency vehicles, law enforcement vehicles, trucks, and utility vehicles. The modular lighting system can be mounted on equipment that is mounted on a vehicle, such as the front of a snowplow, the top of a truck cab, a police car, etc.

15 Claims, 23 Drawing Sheets

(56) References Cited

U.S. PATENT DOCUMENTS

| | | | | |
|---|---|---|---|---|
| 10,793,056 | B2 * | 10/2020 | Horn .................... | B60Q 1/0041 |
| RE48,922 | E | 2/2022 | Dong et al. | |
| 2010/0002426 | A1 | 1/2010 | Wu | |
| 2015/0049167 | A1 | 2/2015 | Suzuki | |

* cited by examiner

FIG. 1 - PRIOR ART
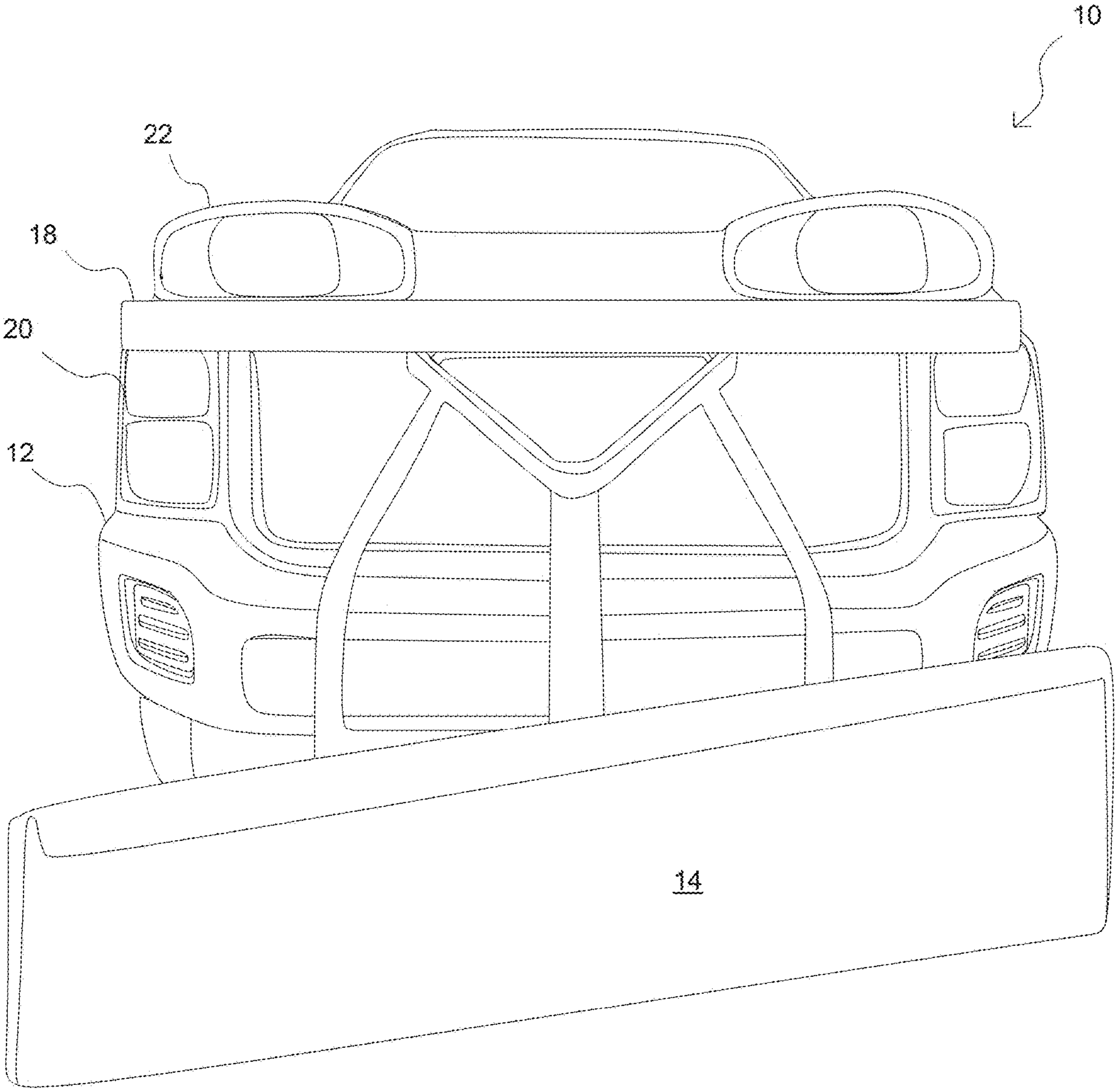
FIG. 2 - PRIOR ART
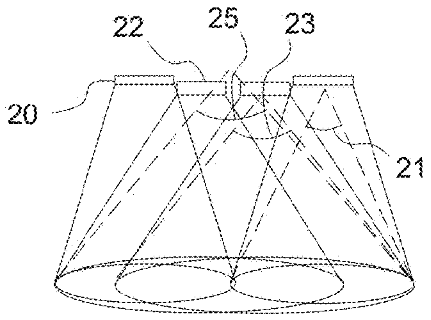

CUSTOMIZABLE MODULAR LIGHTING SAFETY SYSTEM

REFERENCE TO RELATED APPLICATIONS

This application claims benefit of provisional application No. 63/566,908, filed on Mar. 19, 2024, design patent application Ser. No. 29/934,629 filed on Mar. 27, 2024, and design patent application Ser. No. 29/935,673 filed on Apr. 3, 2024, each of which are incorporated by reference in their entirety.

BACKGROUND OF THE INVENTION

1. Field of the Invention

This invention relates generally to modular lighting, and particularly to modular lighting for safety purposes.

2. Description of the Prior Art

U.S. Pat. No. 4,935,665, by Murata, discloses an apparatus for a light emitting diode lamp comprising an insulated metallic board.

U.S. Pat. No. 10,551,546, by Fattal, discloses a head-tracking multi-view display and a system provide a plurality of views of a scene as a multi-view image.

SUMMARY OF THE INVENTION

Advantages and Differences of Invention Over Known Prior Art

As described above, the prior art does provide headlights and attachable lights. Unfortunately, these prior art systems have many disadvantages. Some prior art systems have begun to address these difficulties. For example, for earlier or simple plows 14, the light from the vehicle's headlights 20 are blocked by the plow 14 during the normal course of operation of the plow 14 (lifting the plow). This drastically decreases visibility just when necessary for safe operation of the vehicle 10 and plow 14.

FIG. 1 illustrates one attempt of the prior art to address this problem. As shown, many plow systems 14 will now come with a plow frame 16 which either provides plow lights 22 or allows other lights to be placed on the plow frame 16. Unfortunately, even these plow lights 22 lack full side light beam angles and simple safety features, such as strobing functions.

That is, as shown in FIG. 2, the headlights 20 provide a light beam 21. These additional lights 22 provide an additional light beam 23. However, as the intention of the additional lights 22 is to supplement the light due to the movement of the plow, the actual total light beam angle 25 is not changed. Indeed, most systems provide a total light beam angle of less than 90 degrees. Furthermore, these lights also lack the capability of serving as warning lights to pedestrians and other noncommercial vehicles.

To address this, other users have tried to mount commercially available small strobe lights into appropriate position. This is generally met with further difficulties as when placing lighting on any vehicle, or other piece of equipment, it is difficult to make post manufacture modifications generally. This is further complicated by the difficulty in getting good beam spread due to current bracket designs and the geometry of the surface to be mounted to. Returning to the example of a snowplow, the problem is that strobe lights mounted on the grill become blocked as well.

In some systems, the wiring harnesses are unforgivable specific to type which causes consistent dimming due to inconsistent connector types. There is no consistent control of the post manufacturer product modifications because the wiring harnesses cause shortages.

Even then, with currently available light heads or lamps, post manufacturing mounting is a temporary solution at best. For example, with snowplows, the lamps are exposed to harsh weather and environmental conditions. With the constant exposure to rain, road salt, and kicked up road rocks, the lamps corrode or become loose after only short-term use. With the constant exposure to rain, road salt, and kicked up road rocks, the wire connections within the lamp also become corroded.

By providing brackets that are specialized for unusual circumstances, the present invention overcomes many of these difficulties relating to placement and durability of mounting. By providing a weatherproof module, the present invention overcomes many of these difficulties relating to durability internally. By providing a specialized wiring harness and controller, the present invention overcomes further difficulties by avoiding compatibility installation difficulties. By providing each of these components in an integrated system, the present invention provides a plug and play system capable of addressing all of the stated disadvantages of the prior art.

Objectives

It is an object of the present invention to provide a plug and play modular lighting system for use on vehicles, such as cars, emergency vehicles, law enforcement vehicles, trucks, and utility vehicles. It is another object of the present invention to provide a modular lighting system that can be mounted on equipment that is mounted on a vehicle, such as the front of a snowplow, the top of a truck cab, a police car, etc.

It is another object of the present invention to provide a modular lighting system that is comprised of individual lighting modules which are mounted on a mounting bracket. It is a further object of the present invention to provide different lighting arrangements of the modules using mounting brackets of various sizes and shapes to hold a particular arrangement of modules together.

It is yet another object of the invention to provide each module with a concurrent power connector, which allows the manufacturer to pre-program them, and allows the customer to re-program later (if desired), as well as to connect and use them. Each lighting module can have one, two, or three banks of light emitting diodes (LEDs). It is a further object of the present invention to provide a system having banks of LEDs which may be directed in a different direction or may be directed in parallel in the same direction.

The present invention achieves these and other objectives by providing a customizable modular safety lighting system capable of plug-and-play attachment to a frame of an existing device in an external environment with dust and water. The system has a module with at least one light head, at least one electrical plug, a wiring assembly, a weatherproofing assembly, and a housing with an internal hollow chamber. The housing encloses portions of the at least one light head, the at least one electrical plug, the wiring assembly, and the weatherproofing assembly. The system has a controller capable of providing instructions for at least two safety or hazard light settings to the at least one light head. The system may have a mounting bracket for reversibly affixing the module to the frame of the existing device. The housing may have an inset for supporting the at least one light head. The housing may have a receptacle for supporting the at least one electrical plug.

The at least one electrical plug may be one of a blank plug, a connector plug, and a heat plug. The at least one electrical plug may have a head segment, a sealing segment, and a locking segment for reversible locking engagement with the receptacle of the housing. The weatherproofing assembly facilitates in sealing the internal hollow chamber from the external environment, preventing entry of dust or water into the internal hollow chamber.

The present invention also achieves these and other objectives by providing a modular lighting system capable attachment to a frame of an existing device. The system may have a module that may have at least one light head, at least one electrical plug, a wiring assembly, a weatherproofing assembly, and a housing with an internal hollow chamber. The housing may enclose majority portions of the at least one light head, the at least one electrical plug, the wiring assembly, and the weatherproofing assembly. The housing may have a receptacle for supporting the at least one electrical plug. The at least one electrical plug may have a head segment, a sealing segment, and a locking segment for reversible locking engagement with the receptacle of the housing.

The receptacle of the housing may be formed in a rear portion of a load bearing rear wall of the housing; and an orifice with two opposing notches may be formed within the receptacle. The locking segment of the at least one electrical plug may have a shaft with two extending cam locks for locking engagement with an orifice having two opposing notches within the receptacle of the housing.

The locking segment of the at least one electrical plug may have a shaft with two extending cam locks for reversible locking engagement with the two opposing notches within the receptacle of the housing. The sealing segment of the at least one electrical plug may have a pathway for supporting an o-ring seal for reversible sealing engagement with walls of the receptacle of the housing. The at least one electrical plug may have a column segment for supporting an internal cartridge heater and thermostat.

The at least one electrical plug may have an outlet segment extending from the head segment, the outlet segment having a hollow with electrical pins for connecting with an electrical coupler. Upon installation, the head segment abuts against an external portion of a wall of the housing, the sealing segment extending from the head segment and being positioned within the receptacle of the housing, and the locking segment extending from the sealing segment.

The housing may have walls with a first thickness and load bearing walls with a second thickness, and the second thickness being greater than the first thickness. The front of the housing may have load bearing walls with an inset for supporting the at least one light head; wherein the inset having a pathway for supporting an o-ring seal for reversible sealing engagement with the load bearing walls of the inset of the housing.

The wall of the housing may have external pockets and an integral projection, the integral projection extending into the chamber of the housing, supporting the external pockets, and blocking the pockets from extending into the chamber of the housing.

The customizable modular safety lighting system may have a mounting bracket for reversibly affixing the module to the frame of the existing device.

The mounting bracket for reversibly affixing the module to the frame of the existing device may have a mounting portion for mounting the module and an attachment portion for attachment to the frame.

The at least one electrical plug may be any of a blank plug, a connector plug, and a heat plug. The system may have one or more electrical plug of different types.

The customizable modular safety lighting system may also have a controller capable of providing instructions for at least two safety or hazard light settings to the at least one light head.

BRIEF DESCRIPTION OF THE DRAWINGS

Many additional features and advantages will become apparent to those skilled in the art upon reading the following description, when considered in conjunction with the accompanying drawings, wherein:

FIG. 1 is an illustration of a prior art lighting system.

FIG. 2 is a diagrammatic illustration of the light beam angles formed by the prior art lighting system of FIG. 1.

OTHER EMBODIMENTS

Figure 30:
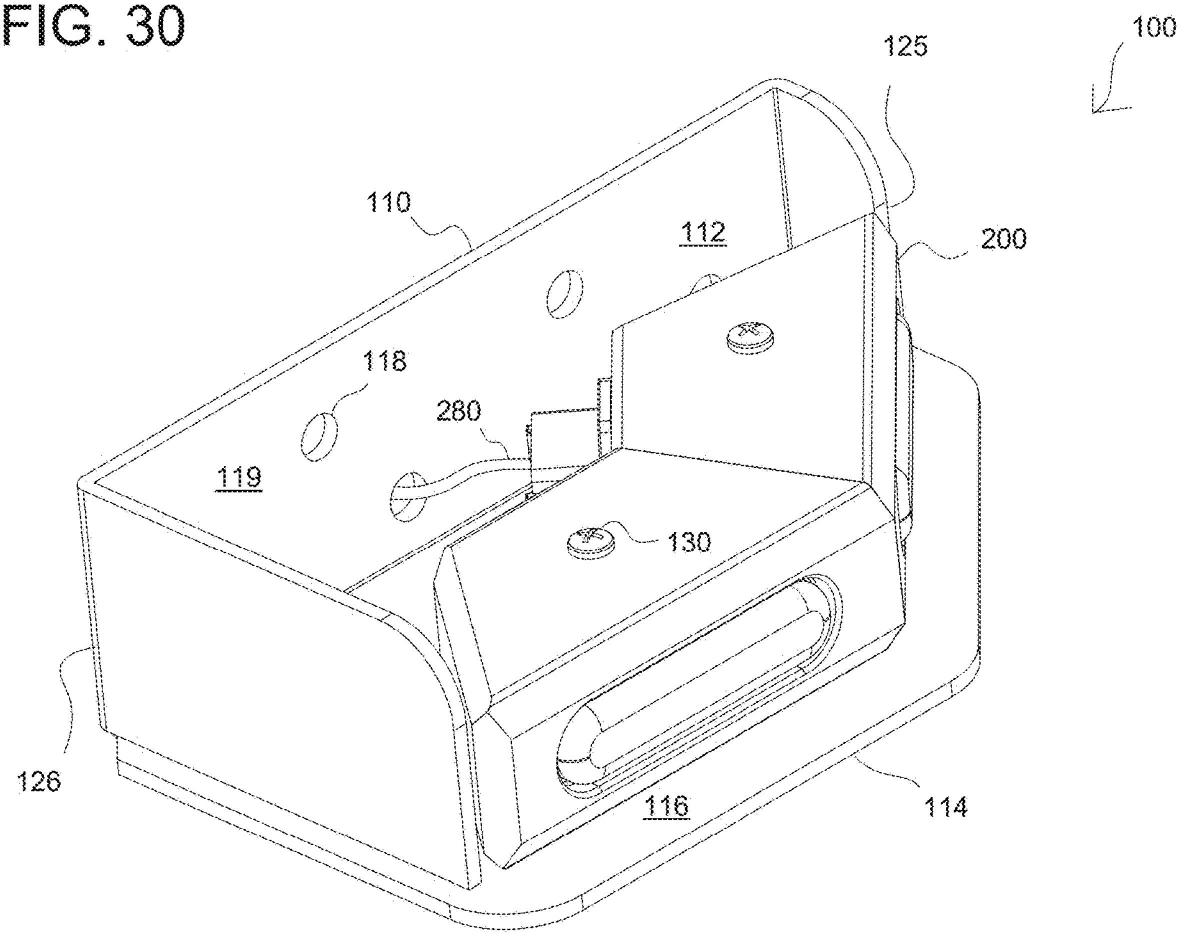

FIG. 30 is a side top front perspective view of a further embodiment of the present invention with modified bracket for front attachment.

Figure 31:
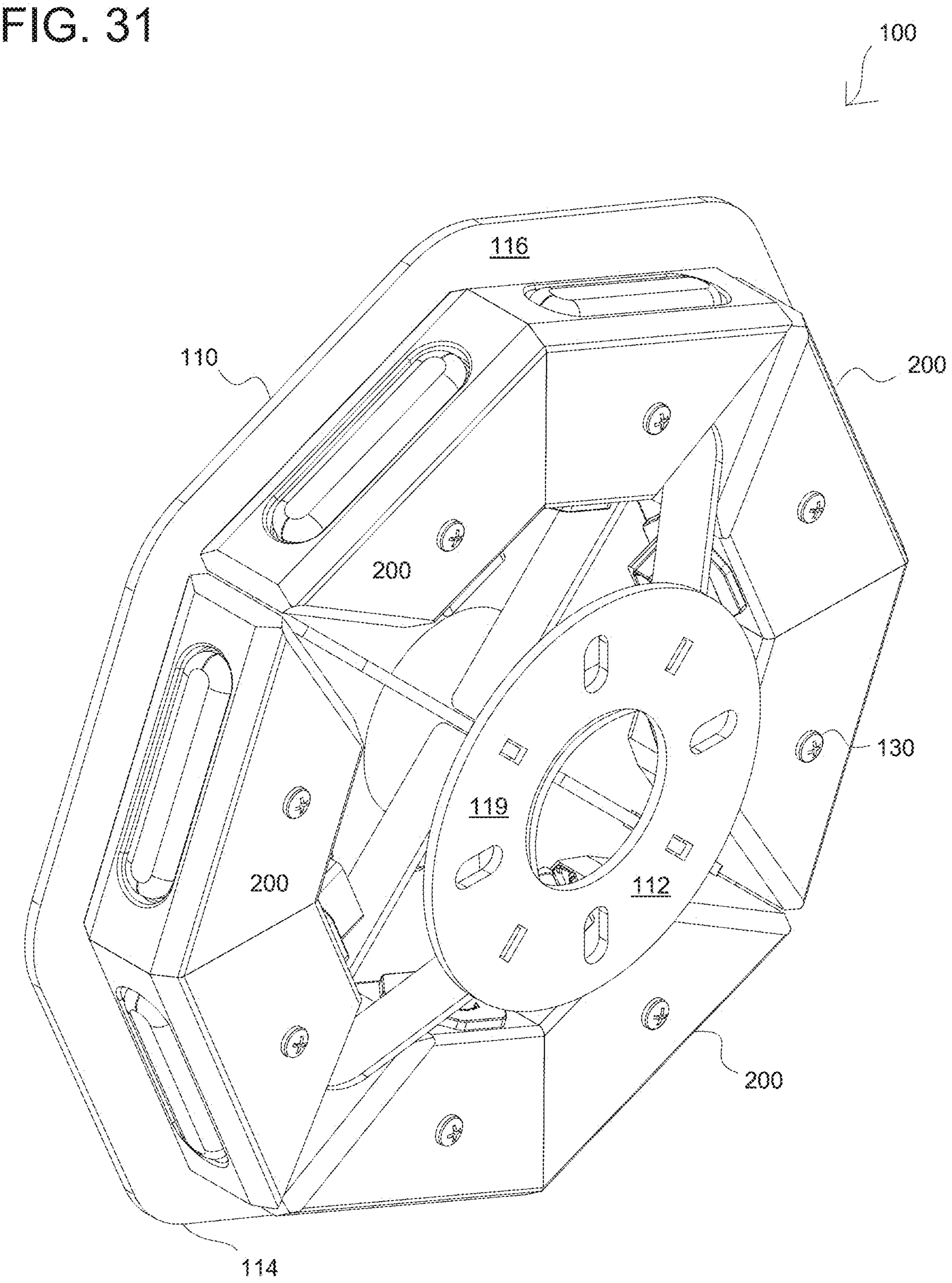

FIG. 31 is a side bottom front perspective view of a further embodiment of the present invention with 360 degree range.

Figure 32:
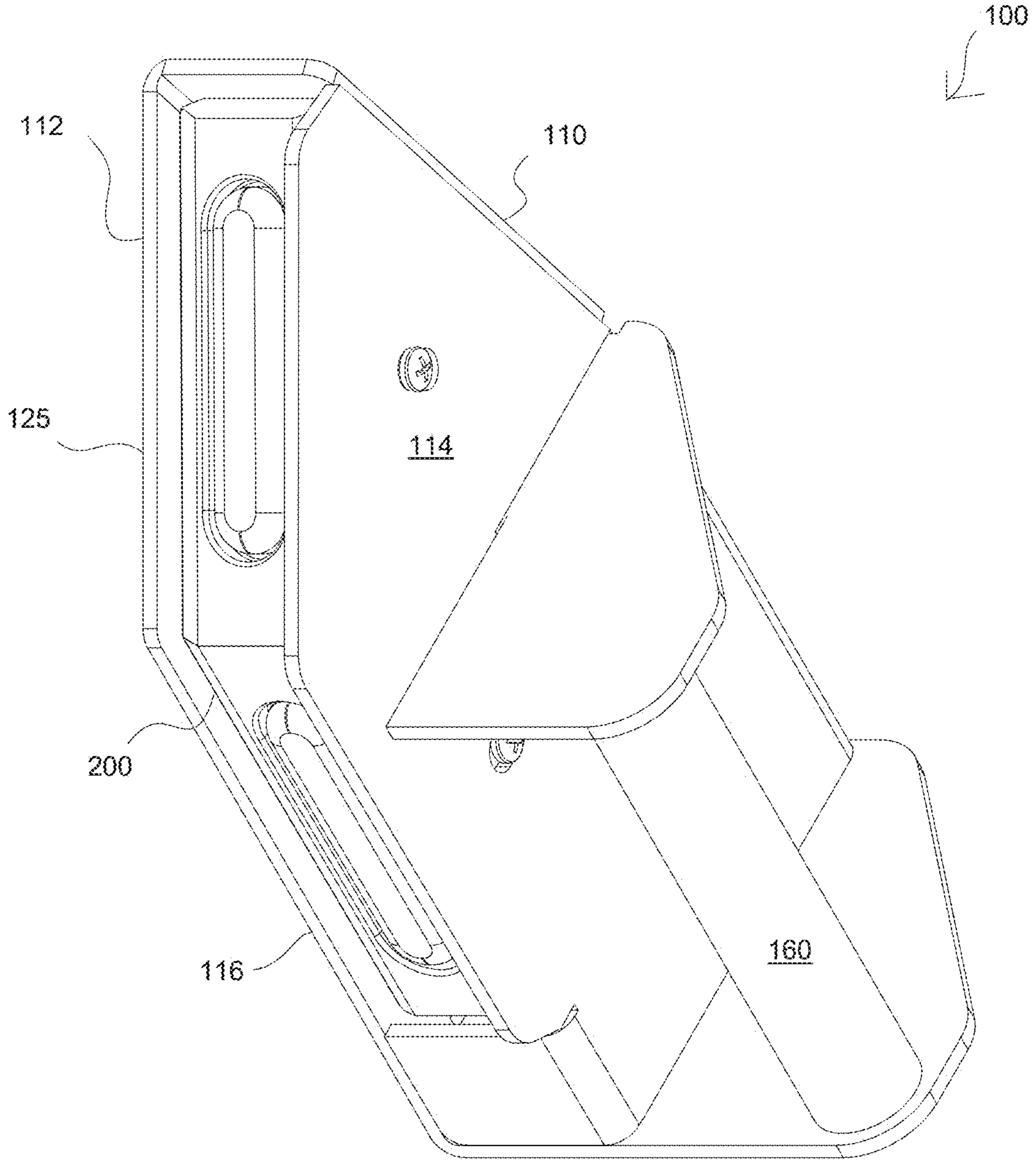

FIG. 32 is a side top front perspective view of a further embodiment of the present invention with modified bracket with access handle.

Figure 33:
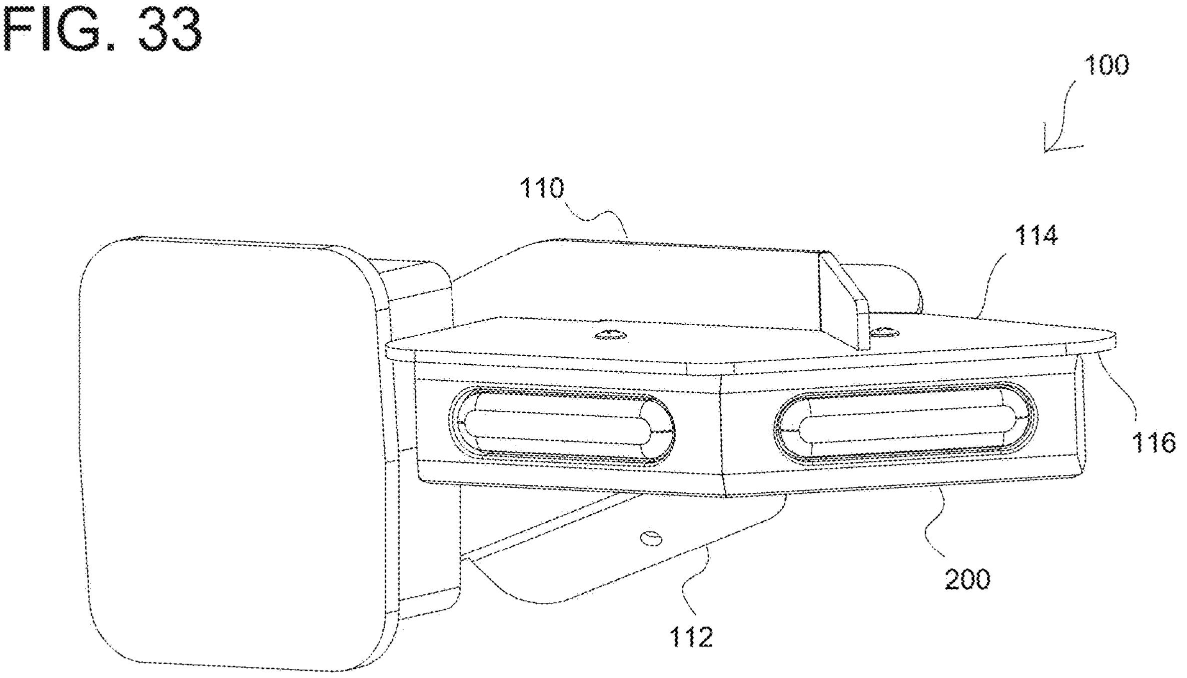

FIG. 33 is a top front perspective view of a further embodiment of the present invention with modified bracket for rear attachment with truck stop light.

Figure 34:
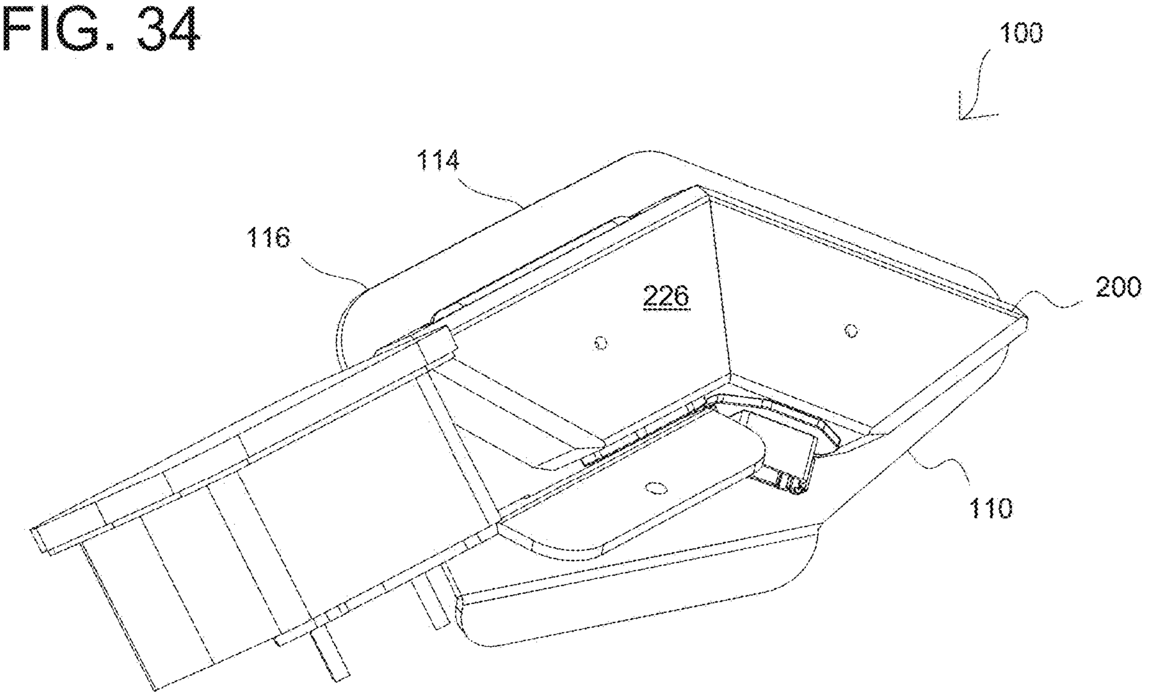

FIG. 34 is a bottom rear perspective view of a further embodiment of the present invention with modified bracket for rear attachment with truck stop light as shown in FIG. 33.

Figure 35:
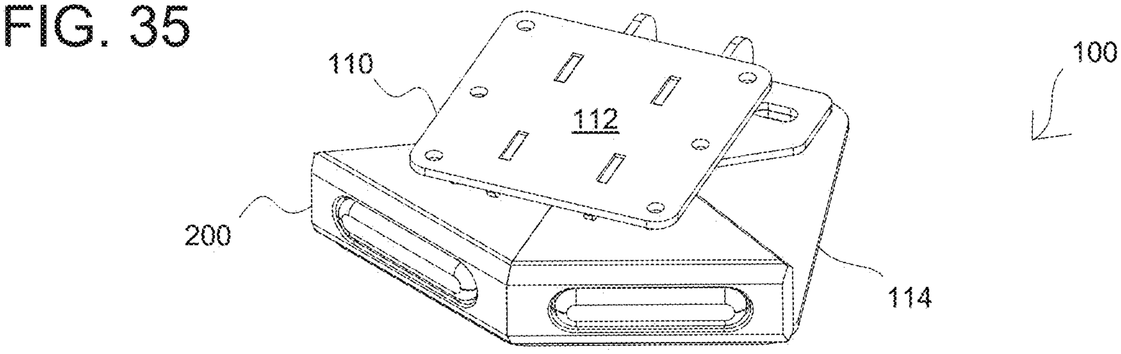

FIG. 35 is a top front perspective view of a further embodiment of the present invention with modified bracket.

Figure 36:
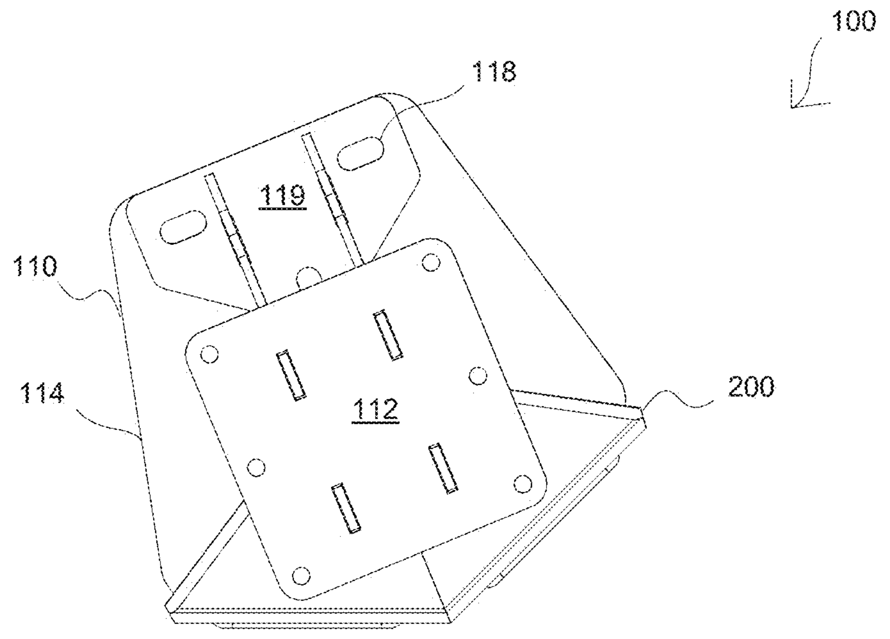

FIG. 36 is a bottom view of the further embodiment of the present invention as shown in FIG. 35.

Figure 37:
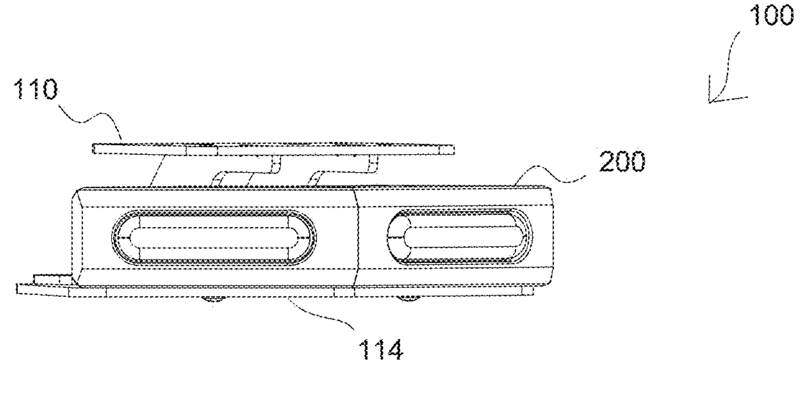

FIG. 37 is a side view of the further embodiment of the present invention as shown in FIG. 35.

Figure 38:
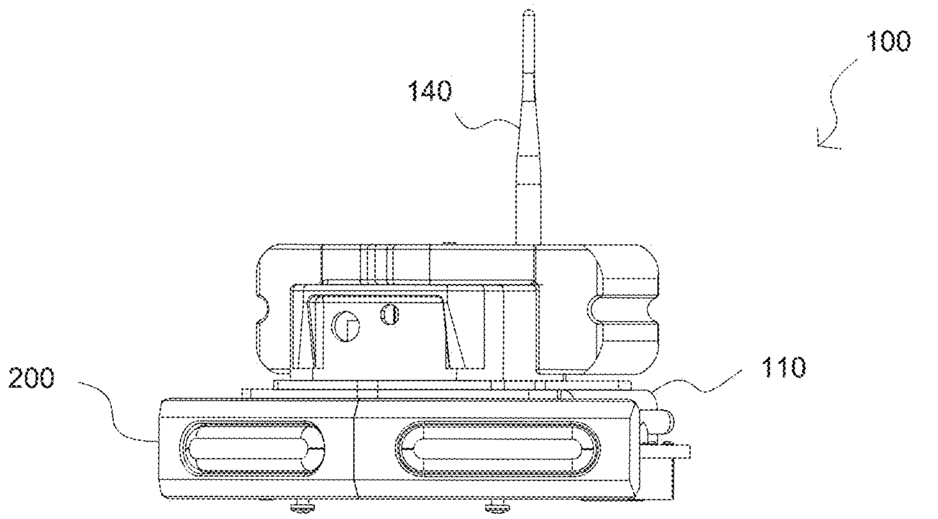

FIG. 38 is a front view of a further embodiment of the present invention with modified bracket and antenna.

Figure 39:
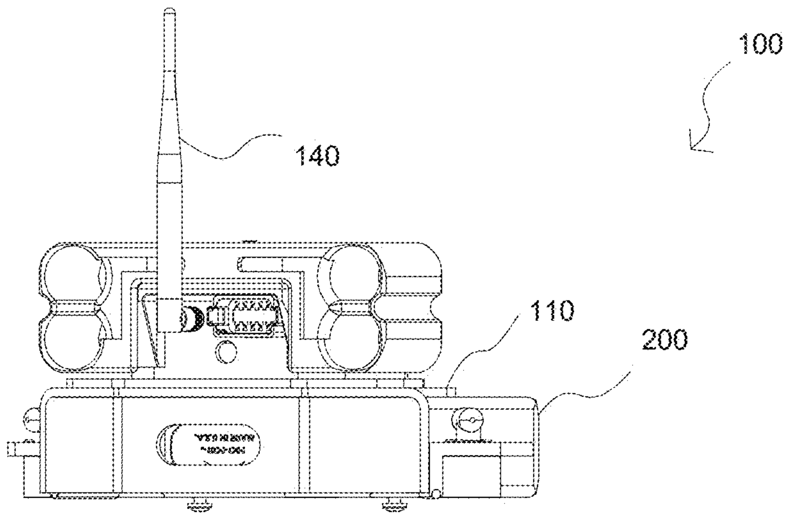

FIG. 39 is a rear view of the further embodiment of the present invention as shown in FIG. 38.

Figure 40:
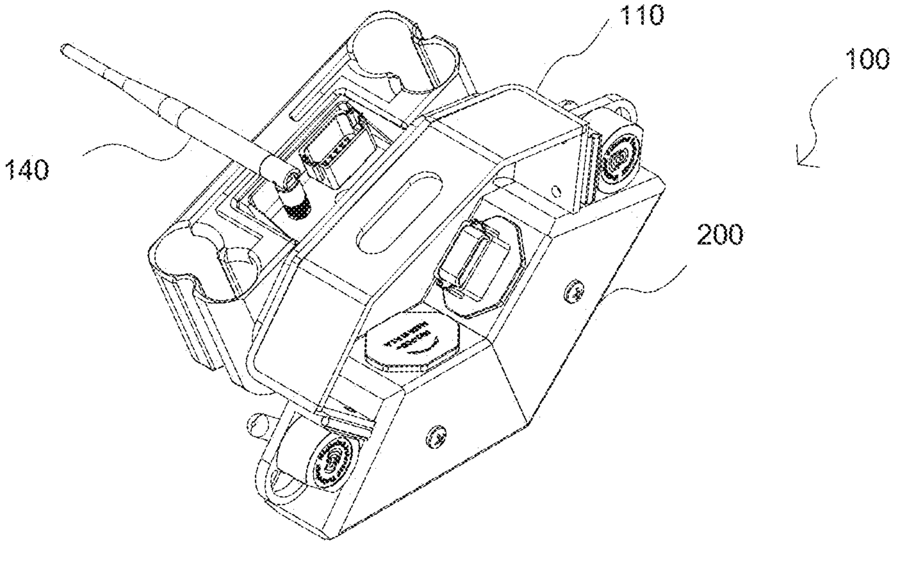

FIG. 40 is a bottom rear perspective view of the further embodiment of the present invention as shown in FIG. 38.

Figure 41:
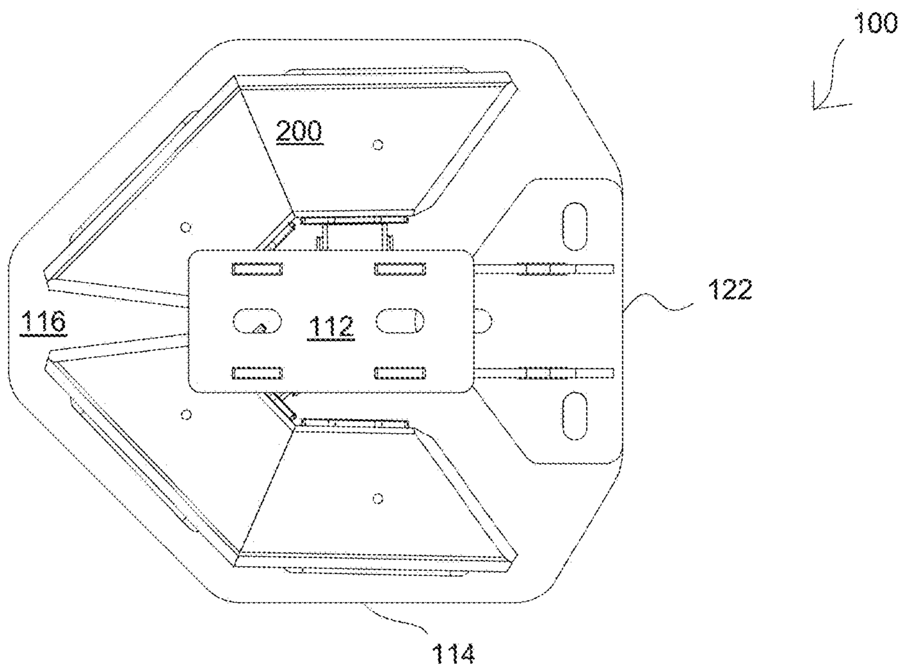

FIG. 41 is a top view of a further embodiment of the present invention with modified bracket and 300-degree field of light spread.

Figure 42:
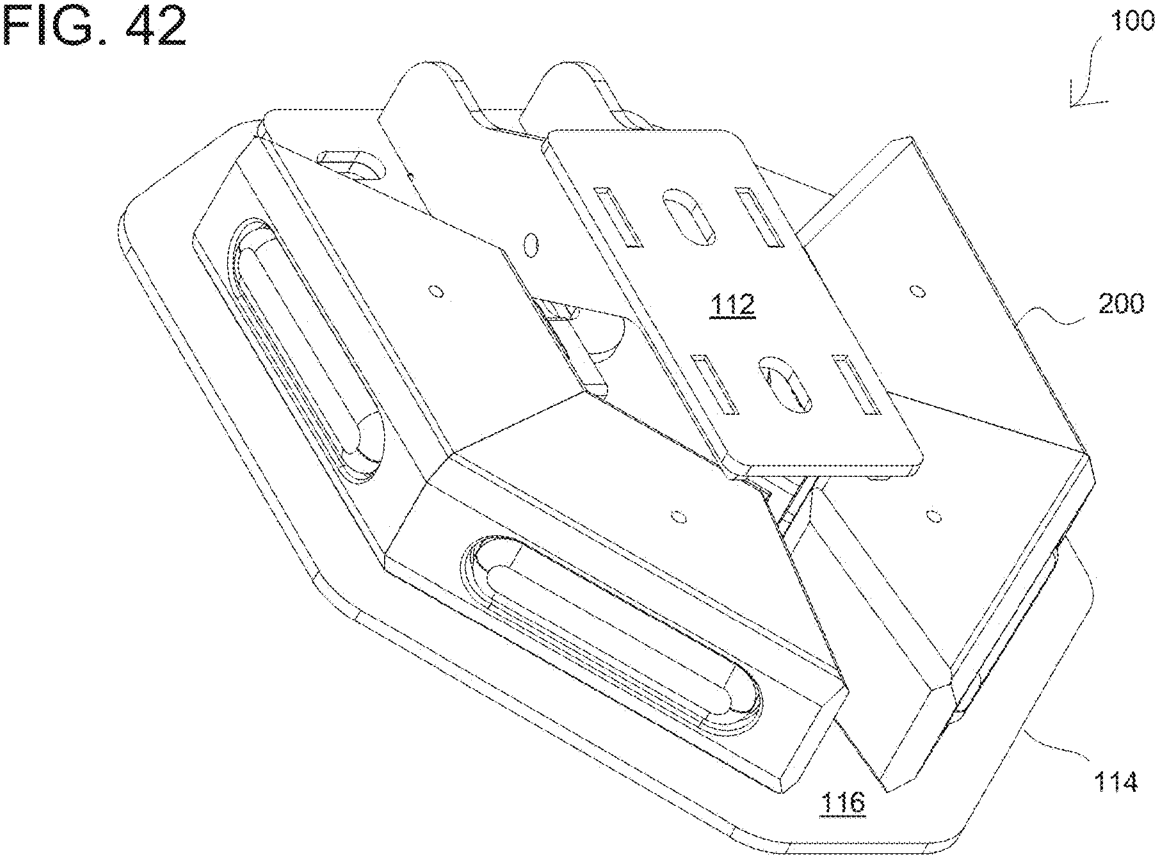

FIG. 42 is a top front side perspective view of the further embodiment of the present invention as shown in FIG. 41.

Figure 43:
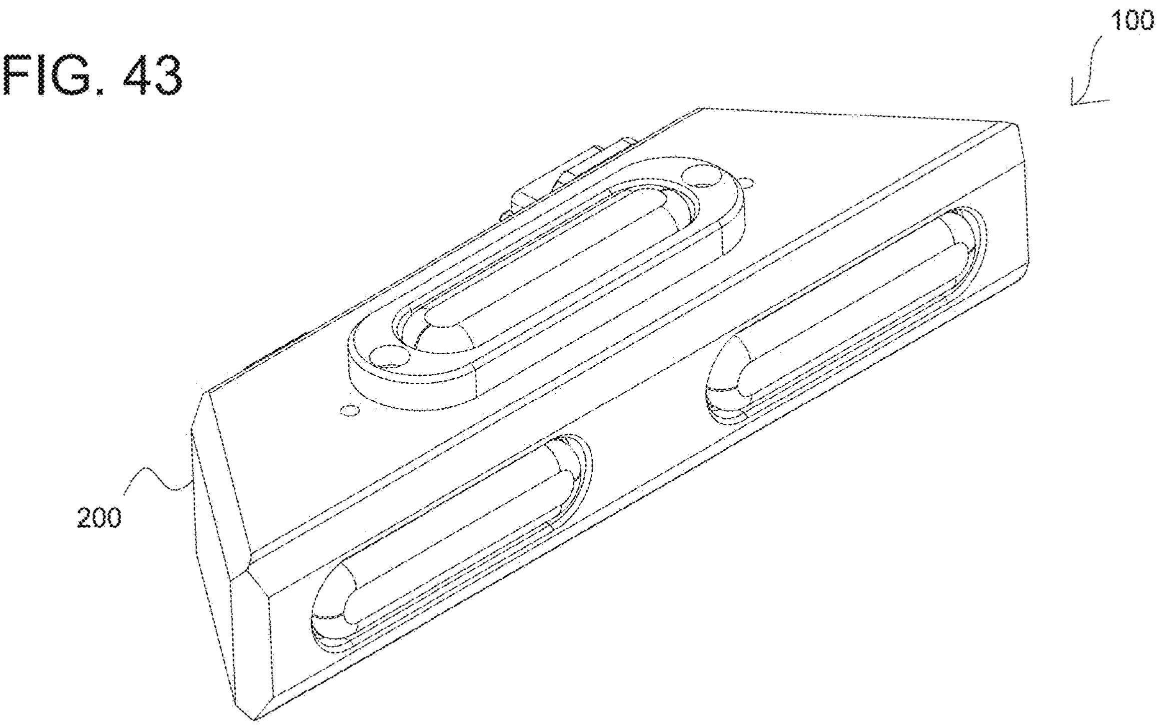

FIG. 43 is a top front perspective view of a further embodiment of the present invention with modified module.

Figure 44:
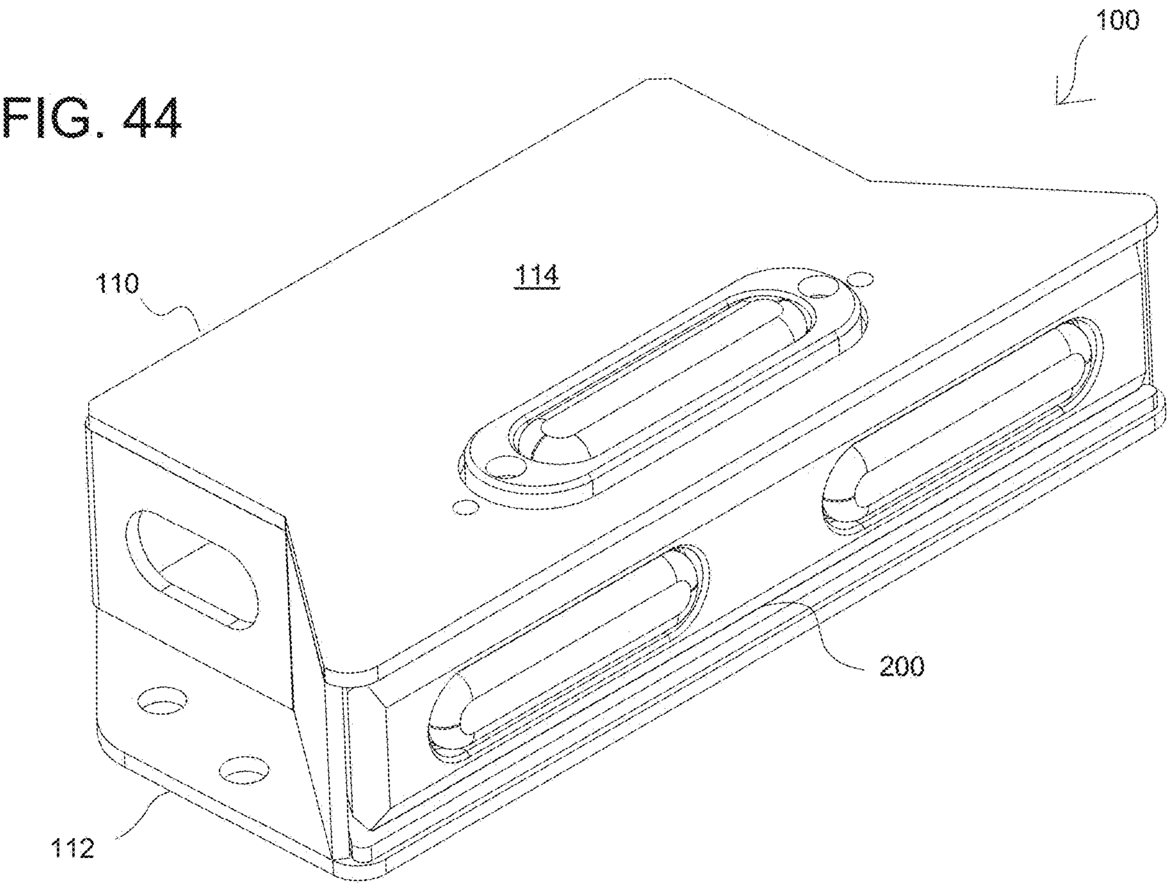

FIG. 44 is a top front perspective view of the further embodiment of the present invention as shown in FIG. 43.

DETAILED DESCRIPTION OF THE INVENTION

The preferred embodiment of the present invention is discussed below with reference to FIGS. 3 to 35. Further details of the present invention are more fully explored, with each mountable safety system 100 including a specialized bracket 110, cabling system, controller, and at least one module 200. Each module 200 may contain various subcomponents including at least housing 220, light heads 260, and weather proofing 300.

Safety System 100

As shown in FIGS. 3-6, the safety light system 100 according to one embodiment has an angled module 200 with a bracket 110 specific for mounting underneath a conventional frame portion of a snowplow 14. The system 100 shown here is a complete plug and play system that requires minimal setup from the end user. The system 100 contains a bracket 110, module 200 with housing 220 and light heads 260, weather proofing subcomponents 300, cabling system 280, and controller 290. Each of these subcomponents are discussed in detail further below.

Mounting Bracket 110

When placing lighting on any vehicle 10 or piece of equipment 14 it is difficult to get good beam spread 30 due to current bracket designs and or geometry of the surface to be mounted to. This is further complicated by the difficulty in making post manufacture modifications generally. The present inventive mounting brackets are specific, multi-purpose, or customized, to allow the modules to be mounted on portions of conventional surfaces.

In the embodiment shown here, the bracket 110 is a flat shaped plate that facilitates one angled module to be mounted to a portion of the frame 16 of the conventional device 14. The module 200 is attached on an attachment portion 112 of the bracket 110 on the top 128 of the bracket 110. Wide margins 119 surround apertures 118 on a mounting portion 114 of the bracket 110. This facilitates ease of installation of the bracket 110 by a user onto the frame 16. One embodiment of this bracket 110 is installed upside down, underneath the frame 16 of the conventional device 14. In one embodiment, the apertures 118 of the mounting portion 114 align with the factory bolt 18 locations of the headlights 20 on the snowplows 14 designed by Fisher®. When mounted to the plow frame 16 under the plow lights 22, the modules 200 are situated so one LED light head 260 is facing to the front 11 of the vehicle and the other LED light head 260 is facing 45 to 90 degrees to the respective side 12. Horizontally extending eaves 116 of the bracket 110 extend beyond the sides of the module 200, providing protection from stray branches or other environmental impact.

Module 200

The present inventive angled modules allows for various mounting styles while allowing the light heads to be angled. The individual light beams of the light heads are multi-directional, this ensures a drastically increased overall beam angle which facilitates the spread of usable light better over the work or warning area. This feature increases the potential use and allows for better safety through maximum visibility.

Specifically, the angled module contains at least two replaceable silicone light heads at a displacement angle to each other to allow for maximum off angle light spread, increasing the beam angle overall. The displacement angle may be in a range of 60 to 20 degrees, more preferably in a range of 50 to 30 degrees and is generally 45 degrees. When the displacement angle is equal to the beam angle, this increases the maximum total beam angle two-fold.

The present invention achieves this angle by miter cutting two pieces of the extrusion shape portions of housing at 22.5 degrees so when placed in alignment with each other they make an included angle of 45 degrees. The opposite ends of the cut housings are mitered at 37 degrees to allow for clearance when placed near each other or near the edge of a bracket. The extra clearance provided allows for ease of alignment to the fasteners and or adjustability in order to better align the modules with regard to the surrounding brackets. Each side part of the module 200 is cut at approximately 6 inches long at its extents, this allows the fitment of a four inch light to be machined in as well as keep the size to a minimum.

The light heads 260 are set in a machined pocket in the front section of the extrusion and are left to protrude from the face of the extrusion by 0.135" maximum, this recess provides the extra protection to the silicone light head from side as well as front impact while allowing the soft face of the bulb to still provide maximum light spread to all angles. The light heads have two threaded studs on the back side for mounting. The light heads are installed through machined slots and holes in the pocketed face. The wires from the light heads exit the light head on the rear of the head and are routed through the same section as it is bolted to, via a slotted hole.

Also in the machined section on the face is an O-ring groove machined to fit around the bolt holes and wire passage. The O-ring seal sits in the respective groove and projects towards the light head by approximately 0.010", this ensures that when the light head is installed into the machined area, it will engage the O-ring and create a true watertight seal between the light head and the extruded aluminum housing. The O-ring used is a trade size (dash number) 031 O-ring seal (see detail below).

The rear of the angled module has symmetrically located machined ports for the purpose of electrical pass through as well as allowing access to the rear of the light heads during assembly thus allowing the nylon locking nuts to be fastened and torqued properly from the inside of the sealed unit.

The rear electrical ports are shaped in such a fashion that their geometry creates a polarized shape and permits fitment in one direction and a locking feature in the rotated 90 degrees direction. This locking feature not only allows for a tool-less assembly in manufacturing but by the end user as well in the case of repairs or changing wire exit locations. The machined electrical port has a flat bottom to accept an O-ring seal (used in a face seal application) as well as an upper chamfered portion that accepts the second O-ring seal (used in both radial and face seal applications) Both O-rings are the same part so as to keep manufacturing simple and end user repairs easy (see info below). During assembly, both O-rings are compressed to their respective faces by rotating the cam lock style geometry creating a watertight seal while applying a spring-like force back on the connector installed in the cavity which keeps them from counter-rotating to the unlocked shape.

The module has two electrical ports, one on each half, centered in the rear face of the housing 220. After assembly, one port will hold the connector that houses the electrical pin plug and one port will hold a heater plug (or blank plug). As both ports are identically shaped, each of these plugs can be installed on either side so as to allow for diverse mounting solutions and better modularity.

Housing 220

The modules 200 of the present invention have housings 220 that have a unique shape to house the light heads 260 in such a fashion that any potential side impacts are minimized, resulting in less possible damage to the light head 260. These housings 220 are typically formed from extrusion and made of aluminum. Housings 220 have top 222, side 224, bottom 226, front 228, and rear 217. The walls 219 of the housing 220 enclose an internal chamber 221 which is hollow to encompass, support, and protect the internal components and wiring 280. When viewed from the top, housing 220 may be straight from side to side. Alternatively, two straight halves 202 may be combined at an angle to make an overall angled housing 220.

Wedge 230

The wedge device 230 of the present invention is a mechanical geometrically locking part which facilitates assembly alignment of two straight halves 202. The wedge 230 also increases the overall finished product strength. The present invention provides the wedge device 230 as an extrusion to aid in manufacturing simplicity. The present invention provides the shape of the wedge to fit in one area of the housing only to keep the final shape consistent throughout the process. The wedge shape is designed to fit between the two straight halves 202 of the main housing 220 during assembly, prior to welding but after the parts are cut to length.

The wedge 230 fits into the housing shape when cut to 22.5 degrees. Once inserted into the housing the wedge shape has enough contact area internally to prevent the two halves from moving in and about the angular axises. The wedge shape permits perfect alignment with regard to angle as well as keeping the two halves apart by a distance of 0.125' (⅛") to allow for sufficient weld penetration in the center welded joint. The wedge shape contains internal cutouts to shave off weight, the internal corners are radiused enough to prohibit cracking on the corners as would be expected with sharp corners. The wedge shape was designed as a linear extruded part to reduce production times by simply cutting the parts to the specified length of 1.725" long.

Walls 219, Load Bearing Walls 218

The housing 220 has walls 219 and load bearing walls 218 with different thicknesses. Walls 218 are thinner on the top and bottom for decreased weight as well as providing more room internally for the routing of the needed wires. These walls 218 have a thickness in a range of 1⁄36 to 10⁄12 inch, more preferably in a range of 1⁄16 to 1⁄5 inches, and usually is 0.1875" (3⁄16") inches.

The rear wall 219 of the housing 220 is a load bearing wall 218 with a greater thickness than the top and bottom walls 219. This greater thickness facilitates allowing the needed depth for the electrical connection assemblies to pass through and provide enough room for O-ring seals without decreasing the structural integrity of the walls 219. The thickness of the rear wall 218 of the extrusion may be in a range of 1⁄16 to 1 inch, more preferably in a range of 1⁄4 to 3⁄4 inches, and usually is 0.500" (1⁄2") inch.

The external size of the housing extruded shape ensures that the housing has a robust enough size to be stand-alone strong while not taking up too much room inside of brackets or mounts. The length of the external housing may be in a range of 1 to 10 inches, more preferably in a range of 1.5 to 5 inches, and usually is around 3 inches. The width of the external housing may be in a range of 0.5 to 10 inches, more preferably in a range of 1 to 5 inches, and usually is around 2 inches.

Rear 217, Receptacle 216

The rear 217 has two receptacles 216 formed within load bearing walls 218 to ensure that when wiring plugs 290, 330, 380 are fully within the receptacle 216, the electrical elements within the chamber 221 of the housing 220 are fully protected by the walls 218, 219 of the housing 220. Pathway 238 along one wall 218 of the receptacle 216 provides a space to support an o-ring seal 338 to provide better protection against weather conditions. While shown along a side wall 219 of the receptacle 216, the pathway 238 may also be formed along the rear walls of the receptacle 216, so long as the exterior portion is sealed against the interior portion. Specifically, orifice 215 needs to be fully enclosed by the seal 338. The orifice 215 has two notches 239 opposite one another for locking engagement with the cam lock 249, 262, 292.

The thicker rear walls 218 allows the receptacle 216 to be formed within the outer boundaries of the housing, thereby providing increased protection against the elements within the structural integrity of the walls 218. The thicker rear walls 218 also facilitates providing ample space to provide the receptacle 216 for recessing the electrical components into the extruded shape once machined without decreasing the structural integrity of the walls 218.

Front 228, Inset 262

The front 228 has two insets 262 formed within load bearing walls 218 to ensure that when the light head 260 is fully placed inside the receptacle 216, the sides of the light head 260 are protected by the walls 218 of the housing 220. Pathway 238 along one wall 218 within the inset 262 provides a space to support an o-ring seal 338 to provide better protection against weather conditions. While shown along the rear wall 219 of the inset 262, this may also be formed along the side walls of the receptacle 216, so long as the exterior portion is sealed against the interior portion. Specifically, screw holes 345 and the electrical wiring slot 237 need to be fully enclosed by the seal 338.

The front 228 of the housing 220 protects the light head 260 within the inset 262 by having a protrusion 263 formed in the wall 218 along the front 228 of the housing 220. This protrusion 263 has a purposeful chamfer 265 with an angle of 30 degrees on both the top 222 and bottom 226 edge. The protrusion 263, inset 262, and chamfer 265 facilitates in deflecting any object that may strike the housing from either the front 228, sides 224, top 222, or bottom 228 so as to mitigate direct impact to the light head 260.

The protrusion 263 of the front wall 218 may have a thickness in a range of 1⁄16 to 1 inch, more preferably in a range of 1⁄4 to 3⁄4 inches, and usually is 0.4375"(7⁄16") inches. This protrusion allows the chamfer 265 to be formed without decreasing the structural integrity of the walls 218. This protrusion 263 also facilitates providing ample space to provide the inset 262 for recessing the light head 260 into the extruded shape once machined without decreasing the structural integrity of the walls 218.

Integral Projection 236

The center section of both walls 219 of the top 222 and bottom 226 of the housing 220 have an integral projection 236 that facilitates an integral pocket or blind tapped hole 223 on the external facing surface of the housing 220. This integral projection 236 is a small portion of the housing 220 that protrudes internally into the chamber of the housing. These integral projections 236 facilitate the location of centralized mounting holes (integral pocket or blind tapped hole 223) which are internally threaded without allowing these holes to pierce into the inside of the cavity chamber 221.

The thickness of the integral projection 236 may be in a range of 1⁄16 to 1 inch, more preferably in a range of 1⁄4 to 3⁄4 inches, and usually is 0.4375" inches. The width of the integral projection 236 may be in a range of 1⁄16 to 1 inch, more preferably in a range of 1⁄4 to 3⁄4 inches, and usually is 0.5625" inches. Not having the mounting holes open to the interior allows for better sealing and drastically improves ingress protection.

End Cap 229

During manufacture, the chamber 221 of the housing 220 remains open for installation of components and connection of the wiring with those components. Housing end caps 229 are fitted to the housing 220 after manufacture and seal the housing 220, closing the chamber 221 within. In the embodiment shown here, the housing end cap 229 fits a cut having a final angle may be in a range of 20 to 50 degrees, more preferably in a range of thirty to forty degrees, and usually is thirty-seven degrees. This shape is such that it provides an end cap to be welded to the end of the housing to both add strength and seal off the end of the housing. The cap may have a thickness that may be in a range of 1⁄32 to 1 inch, more preferably in a range of 1⁄16 to 1⁄4 inches, and usually is 0.1875" (3⁄16") inches.

The cap may have a width that may be in a range of 3 to 4 inches, more preferably in a range of 3.1 to 3.5 inches, and usually is 3.25" (3 1⁄4") inches. The cap may have a length that may be in a range of 1 to 3 inches, more preferably in a range of 1.5 to 2 inches, and usually is 1.725" inches. The size of the end cap facilitates providing an ideal weldable area all the way around the edge of the cap. The cap shape has built in tabs to allow it to only fit on the housing one way. This mitigates the chances of being assembled backwards or upside down and lends to better quality control maintenance.

Materials of Housing 220

While the present housing 220 may be made of other materials, most embodiments of the housing 220 are made of extruded aluminum, specifically an aluminum alloy with unified numbering system (UNS) designation A96061. This is a precipitation-hardened aluminum alloy, containing magnesium and silicon as its major alloying elements. It has good mechanical properties, and exhibits good weldability, and Young's Modulus of this alloy is 69 GPa (10,000 ksi) regardless of temper.

Aluminum alloy is capable of differing mechanical properties depending upon the temper, or heat treatment, of the material. For the present inventive purposes, the alloy has a heat treatment specified to provide the maximum precipitation hardening (and therefore maximum yield strength) for a 6061 aluminum alloy. It has an ultimate tensile strength of at least 290 MPa (42 ksi) and yield strength of at least 240 MPa (35 ksi). More typical values are 310 MPa (45 ksi) and 270 MPa (39 ksi), respectively. This can exceed the yield strength of certain types of stainless steel. In thicknesses of 6.35 mm (0.250 in) or less, it has elongation of 8% or more; in thicker sections, it has elongation of 10%. The typical value for thermal conductivity for 6061-T6 at 25° C. (77° F.) is around 152 W/m K. The fatigue limit under cyclic load is 97 MPa (14 ksi) for 500,000,000 completely reversed cycles using a standard RR Moore test machine and specimen.

Finishing Coat 210

As discussed elsewhere herein, the LED light heads 260 are connected to the 12-pin molded nylon pass through assembly via 5-pin nylon connectors, this allows for further modularity and ease of assembly. Nylon connectors lack any type of inherent ingress protection and therefore need to be contained inside the sealed module. The use of O-rings mentioned above provide the sealing requirements for protecting not only the nylon connectors but the exit point of the wires on the light head itself. However, in addition to these, after the assembly of these elements, a further finishing coat 235 is applied to the completed module 200.

One preferred anodized finish coat is MIL-A 8625 type 3 (TYPE III) hardcoat anodize. The use of an anodize coating is not only for wear, durability, and looks, it has electrically insulating properties which significantly aid in corrosion protection due to the reduction of what is known as galvanic corrosion. For galvanic corrosion to occur, the metals involved must be connected in two ways. First, they must be in electrical contact, either through direct physical contact or through another conducting material, to allow an electric current to flow from one metal to the other. Second, they must also be in ionic contact, so an ion current can flow between them. This requires an electrolyte, namely, a solution containing ions such as from a dissolved salt, an acid or a base. For ionic contact, the metals might be completely immersed in the electrolyte or coated with a continuous film of electrolyte that wets both metals, as can happen when the humidity is high. The present coat The fasteners 130 reduce the likelihood of galvanic corrosion. Specifically, by using plastic (FRP) bolts the present invention reduces the chance of corrosion between the fasteners and the aluminum housing when used in highly corrosive environments. To further protect against galvanic corrosion, the present invention provides an anodize coating 235.

Hardcoat anodize, or simply hard anodize, is a dense anodic coating of aluminum oxide applied by converting a properly cleaned and deoxidized aluminum alloy component into an oxide film using a suitable electrolyte, typically sulfuric acid cooled to nearly freezing, and applied voltages upwards of 100 volts at an applied current density of 24-36 amps per square foot.

The coat finish 210 that is used is Type III, which is done under a precise exacting process with conditions that resulting in a harder, denser, thicker, and more abrasion resistant coating. Hardcoat thicknesses can vary from 0.0005 to 0.0030" and beyond but is dependent on the specific alloy being anodized.

The coat provides increased abrasion resistance, increased wear resistance, increased corrosion resistance, improved aesthetics, dielectric properties as an electrical insulator, improved lubrication, and increased protection from external contamination.

The coat 210 of the present invention may be undyed or dyed. Undyed hardcoat anodize will change the color of the aluminum depending on the particular alloy and the anodic thickness. The color of the aluminum after being hard coat anodized depends on the alloy and the thickness of the coating. Many of the 6xxx-series of aluminum will take on a deep gray-black color while most 7xxx and 2xxx series will appear a more bronze-gray color. On some alloys, the color of the aluminum after hardcoat anodizing will be gray/bronze. For dyed class 2 coatings, black is by far the most commonly specified and will take on a very pleasing, uniform appearance. Due to the dark nature of the undyed coating itself, other colors are not as decorative and uniform appearing. If a color other than black is needed, sampling is required prior to production.

All anodizing is a conversion coating in that a portion of the base materials surface is converted from raw aluminum into aluminum oxide. In general terms, for Type III anodize ½ of the coating thickness penetrates into the surface of the parts while the other ½ of the coating thickness builds up on the surface. Thus for an embodiment with a 0.002" thickness, there is 0.001" dimensional change per surface along the exterior wall 219.

All anodic coatings 210 are electrical insulators so when an electrical grounding surface is required or in order to maintain close dimensional tolerances, surfaces can be readily masked such that those areas will remain anodize free. This can be done using simple rubber plugs, 3D printed silicone stop-offs, precision die cut custom decals, or painted on lacquer applied by hand or CNC programmed robot.

In general, hardcoat anodize coating is left unsealed for most prior art uses. However, the present invention further seals the coat 210 in order to provide increased corrosion resistance and wear resistance. Sealing 211 can be accomplished using deionized water, sodium dichromate, nickel acetate, PTFE or a combination of two or more of these.

Hard anodize coat 210 features according to the methods of the present system include: improved wear resistance, non-conductive, can repair worn surfaces on aluminum, improve parts surface for slide applications, can be black dyed; other colors less decorative, finish is harder than tool steel, and can be ground or lapped.

Fasteners 130

The modules 200 have a blind tapped hole 223 in four locations on the top and bottom surface for mounting the module to brackets 110, located symmetrically on the surface approximately centered. The tapped holes are ¼"-20 NC thread within blind tapped holes 223 that do not penetrate the chamber 221 within the housing 220. This keeps the module unit 200 completely sealed, regardless of installation status. This also negates the need for any additional sealing around fasteners 130 which can be very challenging for users. The fasteners 130 engage apertures 118 of the brackets 110 and then engage blind tapped holes (or pockets) 223 within the housing walls 219.

Breakaway Safety Fasteners

For all of the present invention brackets that mount to the modules subjected to highly corrosive environments or require the need for a "break away" the present invention use fiberglass reinforced plastic bolts. This special hardware will permit enough strength to secure the modules safely to the bracketry while allowing excess forces applied to shear the bolts and creates a "breakaway" safety feature. These breakaway safety features are useful for minimizing damage to bracketry and the equipment or vehicle they are mounted to.

The breakaway safety bolts are typically made of fiberglass reinforced plastic (FRP). These bolts may have a hex head type with flanged features, and an external hex drive style. These bolts may be from an inch to ½ inch long with right handed thread direction, a thread size of ¼"-20, and a screw size decimal equivalent of 0.25". The thread type is generally UNC, with coarse thread spacing, a width of ⅜ inches, a height of 9/32 inches, a flange diameter of 9/16 inches, capable of temperatures in a range of −60° to 190° F.

Tether Plates

In certain applications where a breakaway feature would cause parts to fall or create other hazards, the present invention has an optional tether plate that mounts to the opposite side of the module and is tethered to a solid part of the equipment or vehicle with a flexible cable or strap so as to keep the module from creating a falling hazard.

Antenna 140

Figure 29:
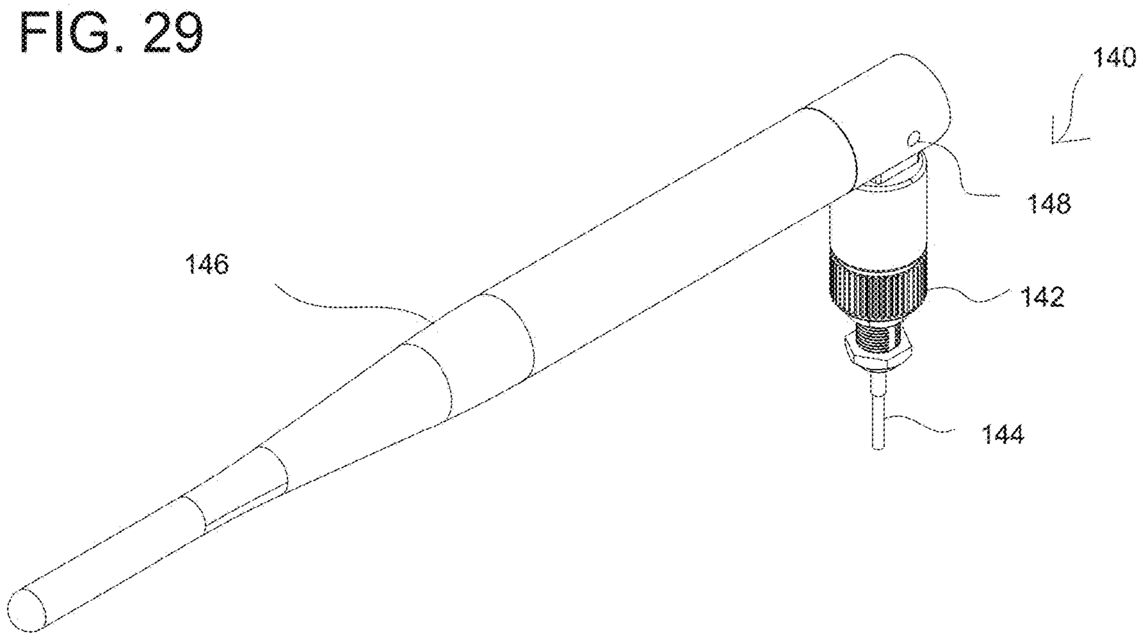
FIG. 29 is a side top front perspective view of an antenna according to one embodiment of the present invention.

Some embodiments of the safety lighting system 100 according to the present invention have an antenna 140. As shown in FIG. 29, such an antenna 140 may have a threaded connector or lock nut adaptor 142 which has a corresponding aperture for locking engagement with the bracket 110. The antenna 140 may have wiring 144 for connecting to the module 200. The antenna 140 may have a rubber mast 146 for receiving and transmitting signals, instructions, or other programming directives to and from the module 200. The antenna 140 may have a pivot 148 which allows reduced size and impact.

Light Head 260

As previously discussed, FIG. 2 illustrates a diagram of the standard light beam angles formed by the prior art lighting systems. Standard headlights 20 generally provide a total light beam 21 with an angle of less than 40 degrees. Additional lights 22 provide an additional light beam 23. However, due to the purpose of these lights (again, to supplement the light in front due to movement of the plow) all known systems still provide a total light beam angle 25 of less than 90 degrees, and generally, less than 50 degrees.

Contrary to the prior art, the multi-angled embodiments of the present invention have a total light beam angle 268 in a range of 160 to 280 degrees, more preferably in a range of 180 to 220 degrees, and is generally at least 200 degrees.

This is made possible because the housing 220 of this embodiment holds a second light head 266 at a displacement angle from the first light head 260 of the system 100. Specifically, the angled module contains at least two replaceable silicone light heads at a displacement angle to each other to allow for maximum off angle light spread, increasing the beam angle overall. The displacement angle may be in a range of 60 to 20 degrees, more preferably in a range of 50 to 30 degrees, and is generally 45 degrees. This increases the maximum potential beam angle to a wide beam angle in a range from 180 to 220 degrees, with each of the individual light heads 260 each having a wide beam angle in a range from 80 to 130 degrees.

Light heads according to the present safety lighting system have an optic-grade shatterproof silicone lens. A durable convex shaped lens 264 that is almost shatterproof is preferred. This allows for a versatile, high-performance lighting system that may be used in a wide range of applications from emergency vehicles to work trucks and anything in between.

A key feature of the "squishy light," an industry-coined term based on the silicone material, is its moldable material that allows for the optic lens and housing to be an all-in-one piece, which improves the sealing, durability, and optic output. The individual LED light heads make for flexible installations and customization.

The light heads may have a single color with & 8 LEDs, dual color with 12 LEDs, or tricolor with 18 LEDs. One potential light head that would meet these requirements is the mPower® Facia 4 made by SoundOff Signal.

The light heads 260 of the present invention using moldable optical silicone elastomers have an intense light output and allow for high light transmittance providing extreme optical clarity and a long optical path length. In addition, low haze and scatter, maximizes light output in a given direction. The light heads 260 of the present invention have increased photothermal stability. Traditional polycarbonate lenses often become brittle, lose clarity and change color over time when exposed to chemicals or sunlight (UV light). In contrast, the silicone lenses of the present invention are highly resistant to UV light and most harsh chemicals, actually becoming clearer when exposed to sunlight. The light heads 260 of the present invention have increased flexibility, can withstand heat better than plastic, and are lighter than glass.

Light Head O-Ring Seal Info

As discussed above, the 12-pin connector has a molded adapter for the housing, a rotation limiter lug, and an O-ring grooves the camp for locking, and the slot to aid in release of the rotation limiter. The light O-ring may have a material made of a rubber such as Buna-N Rubber. The O-ring may have a square cross-sectional shape with a 031 dash number, a fractional width of 1/16 inches, a fractional inner diameter of 1¾ inch, and a fractional outer diameter of 1⅞ inch. The O-ring may have an actual width of 0.07" inches, an actual inner diameter of 1.739" inch, and an actual outer diameter of 1.879" inch. The O-ring may have a hardness with a durometer of about 70 A. The O-ring may meet the following specifications ASTM D2000, SAE AS568, and SAE J200, being RoHS 3 (2015/863/EU) compliant and REACH (EC 1907/2006) (Jun. 10, 2022, 224 SVHC) compliant. The O-ring may have a temperature range of −30° to 212° F.

Plug Connector 240

The electrical pin plug connector 240 may be made from injection molded nylon 6-6 material or any similar material capable of supporting the complex shape and strength needed to endure severe duty while also being electrically insulating. The nylon plug housings are internally over molded with a softer adhesive-type plastic to affix and seal the wires to the outer shell. This provides a permanent seal for the wires and terminals at the point of connection. One potential adhesive-type plastic that would be suitable for this purpose is TECHNOMELT® PA 638 BLACK.

The electrical pin connector, once installed in the aluminum housing, is designed to mate directly to an industry standard coupler. The connector matingly connects with a respective coupler and provides superior electrical properties and weather resistance in an attractive, economical, and user-friendly product. The coupler is precision engineered with silicone seals to provide positive, weather resistant connections, and to function flawlessly even after hundreds of connect/disconnect cycles. Two potential couplers that would be suitable for this purpose are the 12 pin DT series Deutsch connector and its compatible Amphenol style connector.

The connectors have an ingress rating of in a range between IP24-IP69, and more usually an ingress rating of at least IP68. The first digit indicates the level of protection the enclosure provides against access to hazardous parts (e.g., electrical conductors, moving parts) and the ingress of solid foreign objects. The second digit indicates the level of protection that the enclosure provides against harmful ingress of water.

At this degree of dust protection, the connectors are entirely effective against any ingress of dust, i.e.,: "no ingress of dust; complete protection against contact (dust-tight)." During manufacture a vacuum must be applied in order to provide this degree of protection against dust. At this degree of water protection, the connectors are entirely effective against at least 1 meter water immersion and generally up to 3 meters. This means that the equipment is suitable for continuous immersion in water under suitable working conditions (up to 1 meter under water).

Each system 100 is provided with at least one electrical plug connector 240. The main body 241 of the connector 240 has four integrated segments, a head 242, sealing segment 246, locking segment 248, and outlet segment 251. The body 241 may be formed injection molded nylon 6-6 material.

The head 242 has a general irregular octagonal shaped face 343 caused by the presence of bosses 244 along opposing sides of the face 243. The face 243 may have an exterior edge 24 which is chamfered or filleted. These bosses 244 extend outward from an internal axis of the body 341. In some embodiments, the bosses 244 are solid protruding features on the body 241 specifically to cap the holes in the module for the threaded fasteners 349. In other embodiments, the bosses 244 are protruding features on the body 241 with corresponding holes to facilitate the threaded fasteners 349.

The sealing segment 246 extends integrally upwards from the head 242 and is generally a cylindrical shape. The sealing segment 246 has at least one pathway 247 along an exterior portion. This pathway 247 may extend inward along the exterior portion of the sealing segment 246 to support the O-ring seals 338.

The locking segment 248 extends integrally upwards from the sealing segment 246. The diameter of the locking segment 248 is equal to the diameter of the locking segments 360, 390 which are all less than the diameter of the cylinder of the sealing segment 246 which is equal to the diameters of the sealing segments 350, 385.

The outlet segment 251 extends integrally downwards from the head 242 (on the face 243 side opposite the sealing segment 246). The outlet segment 251 has a hollow 253 with pins 254 which corresponds to the coupler 259. The coupler 259 has side release buckles 258 which engage side release clasps 255 along the internal wall of the hollow 253 of the outlet segment 251.

Figure 19:
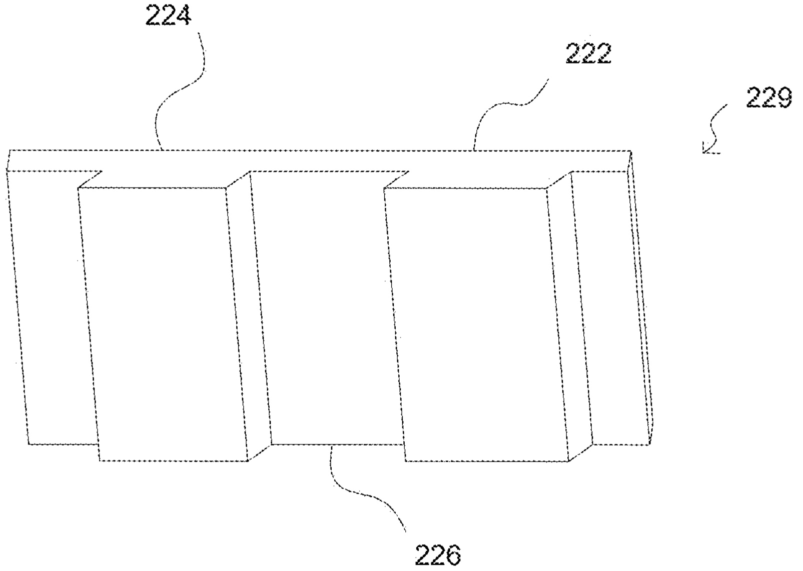
FIG. 19 is a side top front perspective view of the end cap according to one embodiment of the present invention as shown in FIG. 15.
Figure 20:
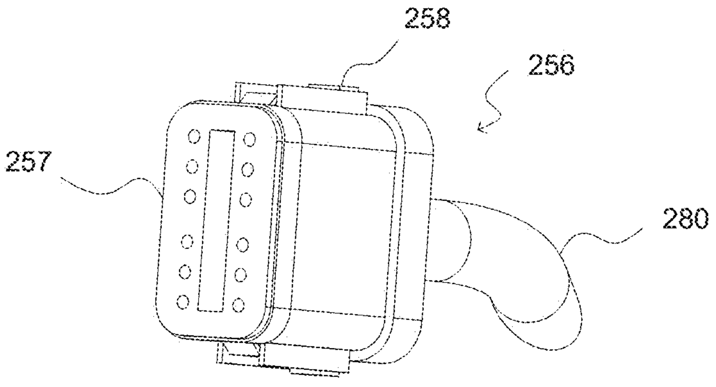
FIG. 20 is a side top front perspective view of the electric wiring coupler of the wiring system according to one embodiment of the present invention as shown in FIG. 12.
Figure 21:
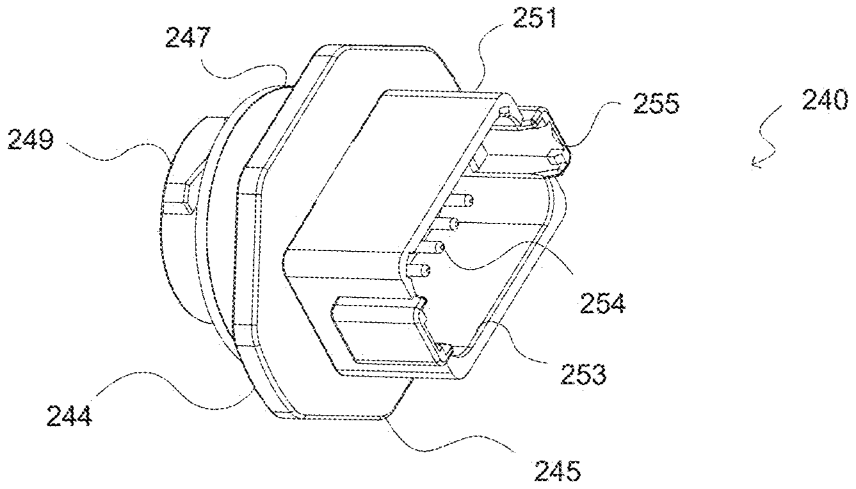
FIG. 21 is a side top rear perspective view of the electric wiring connector plug of the wiring system according to one embodiment of the present invention as shown in FIG. 12
Figure 22:
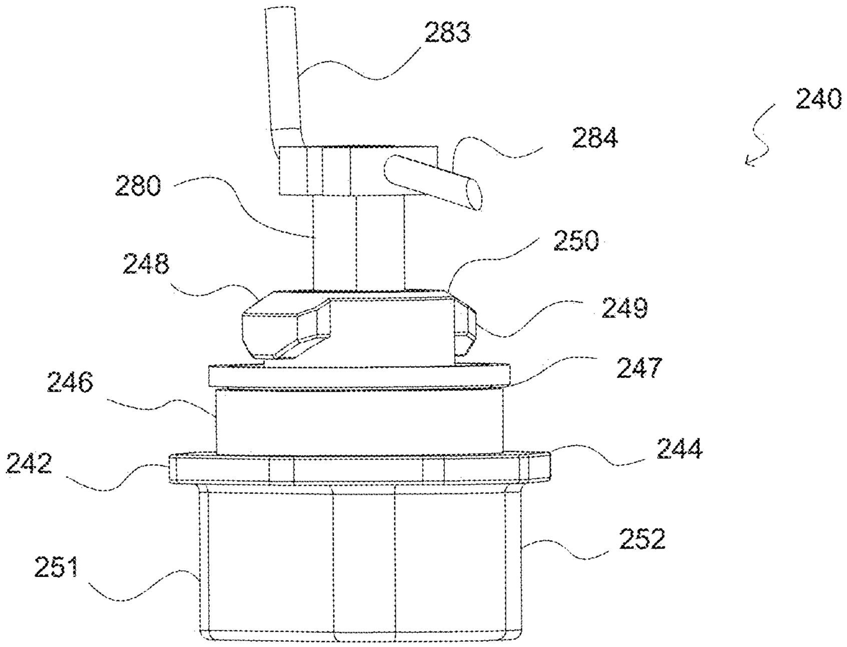
FIG. 22 is a rotated side top view of the electric wiring connector plug of the wiring system, with elements of the wiring system, according to one embodiment of the present invention as shown in FIG. 12
Figure 23:
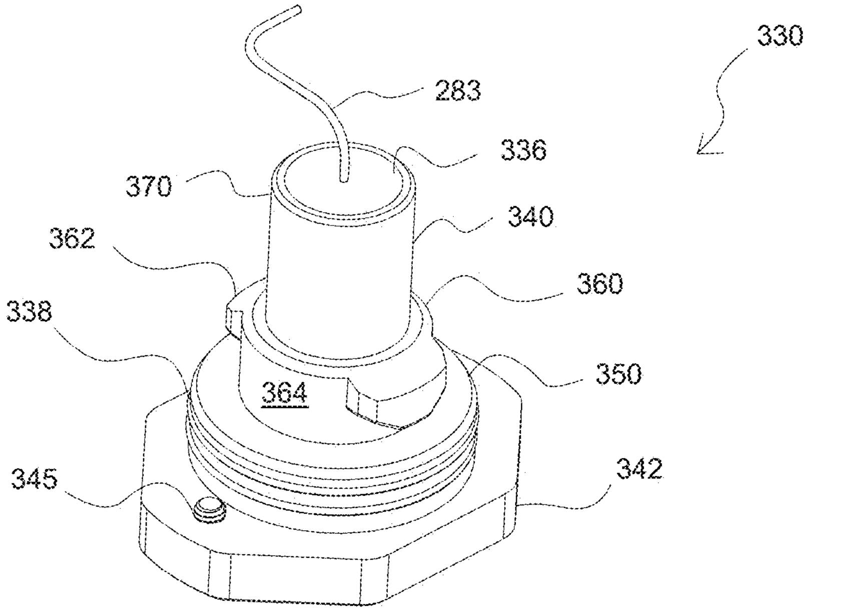
FIG. 23 is a rotated side top front view of the heater plug of the wiring system (these elements are within the module and not normally visible when assembled), with elements of the wiring system, according to one embodiment of the present invention as shown in FIG. 12.
Figure 24:
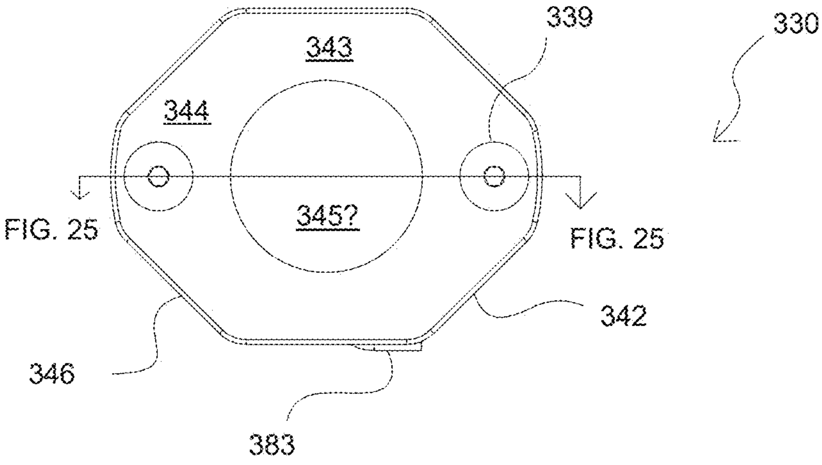
FIG. 24 is a rear view of the heater plug of the wiring system (only this rear face is visible after assembly), with elements of the wiring system, according to one embodiment of the present invention as shown in FIG. 12.
Figure 25:
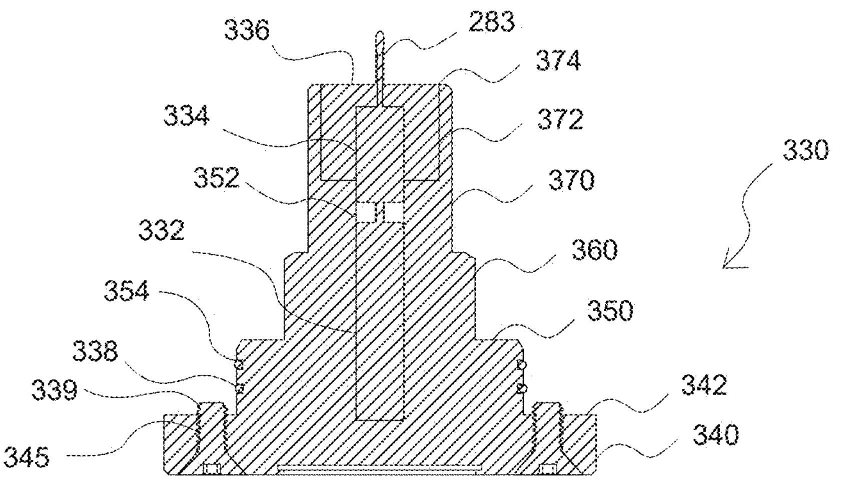
FIG. 25 is a top-down cross-sectional view of the heater plug according to one embodiment of the present invention shown in FIG. 12, according to the view line of FIG. 24.
Figure 26:
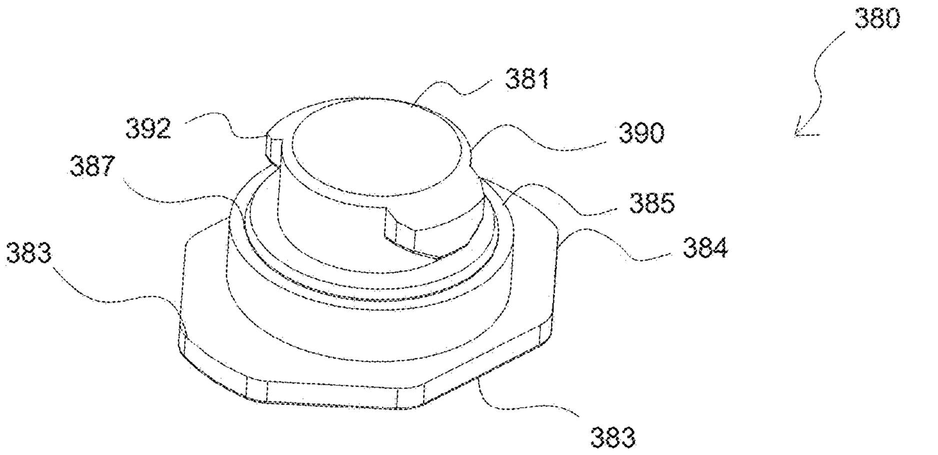
FIG. 26 is a rotated side top front view of the blank plug (these elements are within the module and not normally visible when assembled), according to one embodiment of the present invention.
Figure 27:
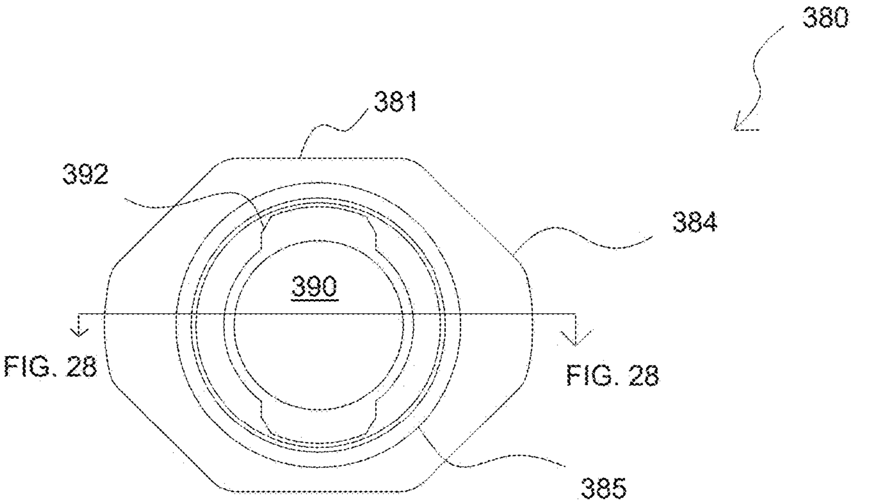
FIG. 27 is a rear view of the blank plug of the wiring system (only this rear face is visible after assembly), according to one embodiment of the present invention.
Figure 28:
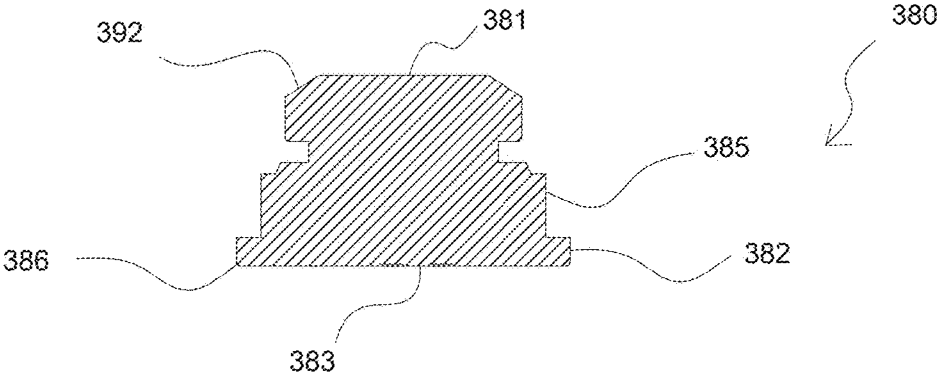
FIG. 28 is a top-down cross-sectional view of the blank plug according to one embodiment of the present invention, according to the view line of FIG. 27.

Although the o-ring seals 338 themselves are not shown in the close-up views in FIGS. 19, 20, the connector 240 supports the same o-ring seals 338 as used for the light head and discussed elsewhere herein. Alternatively, the electrical connector 240 may have an O-ring made of a material rubber such as nitrile butadiene rubber. The O-ring may have a square cross-sectional shape with a 028 dash number, a fractional width of 1⁄16 inches, a fractional inner diameter of 1⅜ inch, and a fractional outer diameter of 1½ inch. The O-ring may have an actual width of 0.07" inches, an actual inner diameter of 1.364" inch, and an actual outer diameter of 1.504" inch. The O-ring may have a hardness with a durometer of about 70 A. The O-ring may meet the following specifications ASTM D2000, SAE AS568, and SAE J200, being RoHS 3 (2015/863/EU) compliant and REACH (EC 1907/2006) (Jun. 10, 2022, 224 SVHC) compliant. The O-ring may have a temperature range of −30° to 212° F.

Wiring 280

The present invention provides wiring 280 includes a cable 281 that has been custom made for this system 100 and is a combination of two different size wires made into one unified cable. The cable 281 consists of ten conductors that are AWG20 (American wire gauge) and two that are AWG14. The two conductors that are AWG14 are used for a specific accessory that can be added to any of the modules from the start or at any point in the future, this accessory is a heater 330 that is designed to keep the temperature of the entire module above a minimum of 45 degrees Fahrenheit to keep ice from forming in colder climates. The heater is self regulating to not exceed 75 degrees Fahrenheit. This accessory requires a larger amperage draw so the wires must be larger to accommodate the use. The 10 wires that are 20*g* are for powering and or programming the LED light heads. The reason for the number of wires to be 10 is that each head has 5 wires to control all the available functions. Using these cables the present invention can achieve certain patterns with regard to specific needs of differing controllers. The present invention offers wye connectors as well as pigtail connectors for the end user to be able to modularly design the system that works for them from the present invention components. The present invention offer an extra sealed connector for the rear of the module that eliminates the need for a 12 pin plug by passing the 12 conductor cable through the molded connector; this is needed for sustained use underwater, for example, when the modules are used in a marine environment under a boat dock or lift. The different cable connectors are modular and all plug to one another to further align the product with the theory of ease of use and simplicity of construction. The cable is custom made by Multi-Cable in Connecticut, the specs are: P/N: 8(2C14-10C20). Two conductor 14 gauge (41/30) tinned copper & ten conductor 20 gauge (7⁄28) tinned copper. 0.015" PVC insulation, 0.035" 105° C. black PVC jacket. 0.410" nominal OD 105° C., 300 volt.

Controllers 290, 295

The system 100 comprises at least end user has the option to use their own switches as well as wiring. However, the present invention cabling system when matched with at least one of the present invention controllers 290 makes a complete plug and play system 100 that requires minimal setup from the end user.

Wired Controller: 290

Figure 3:
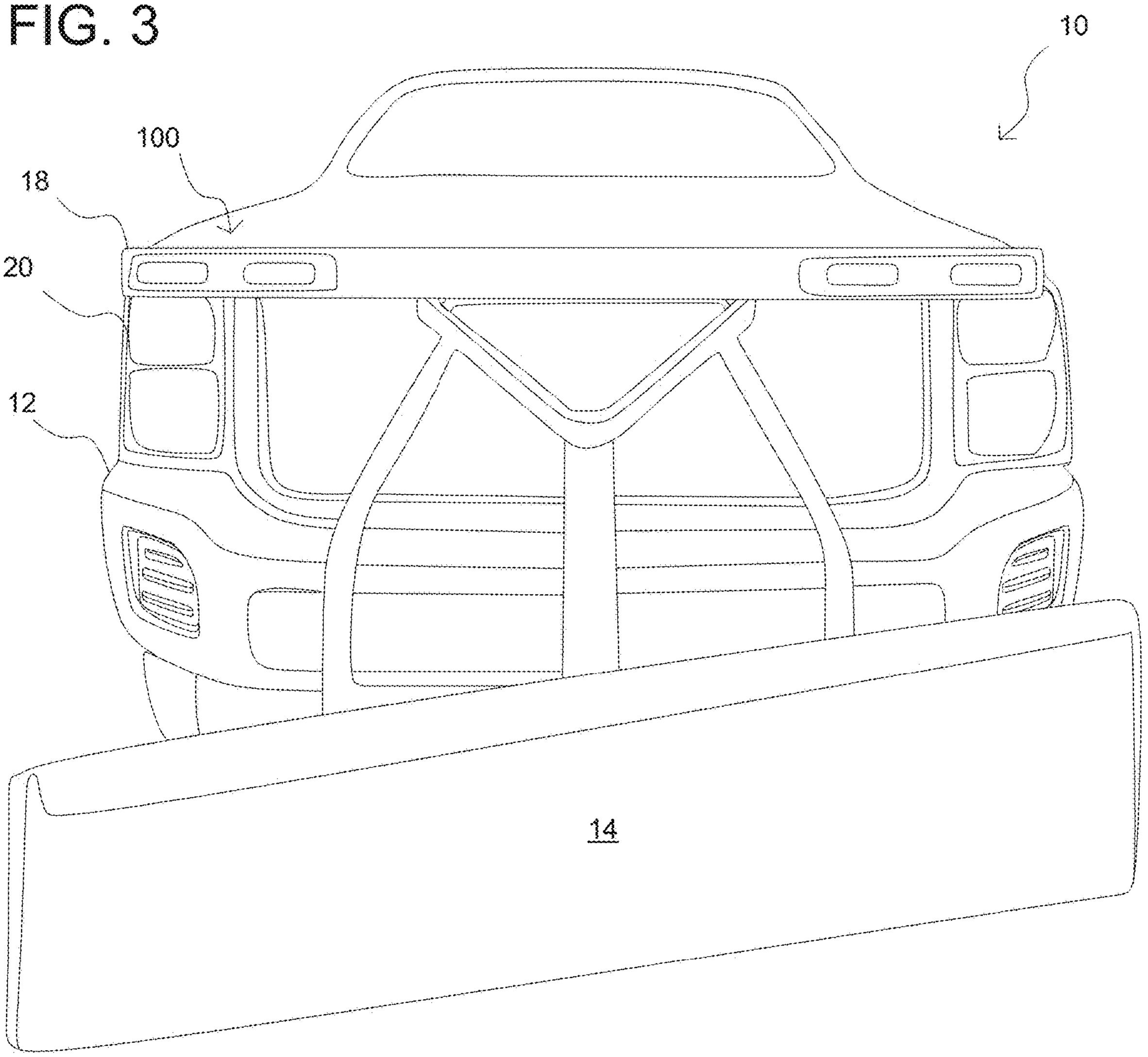
FIG. 3 is an illustration of one embodiment of a safety lighting system according to the present invention with two modules symmetrically mounted, one module mounted on a frame of the snowplow.
Figure 4:
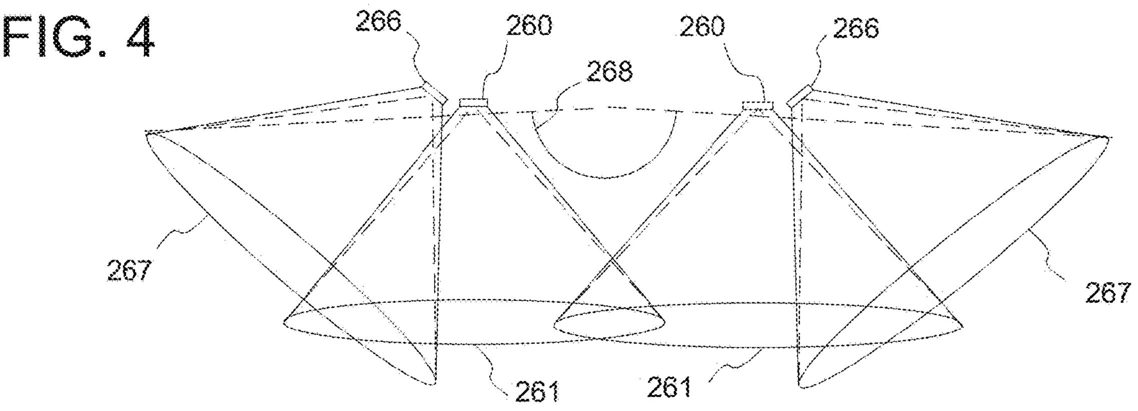
FIG. 4 is a diagrammatic illustration of the improvement of the total light beam angle formed by the embodiment of the safety lighting system according to the present invention of FIG. 3.
Figure 5:
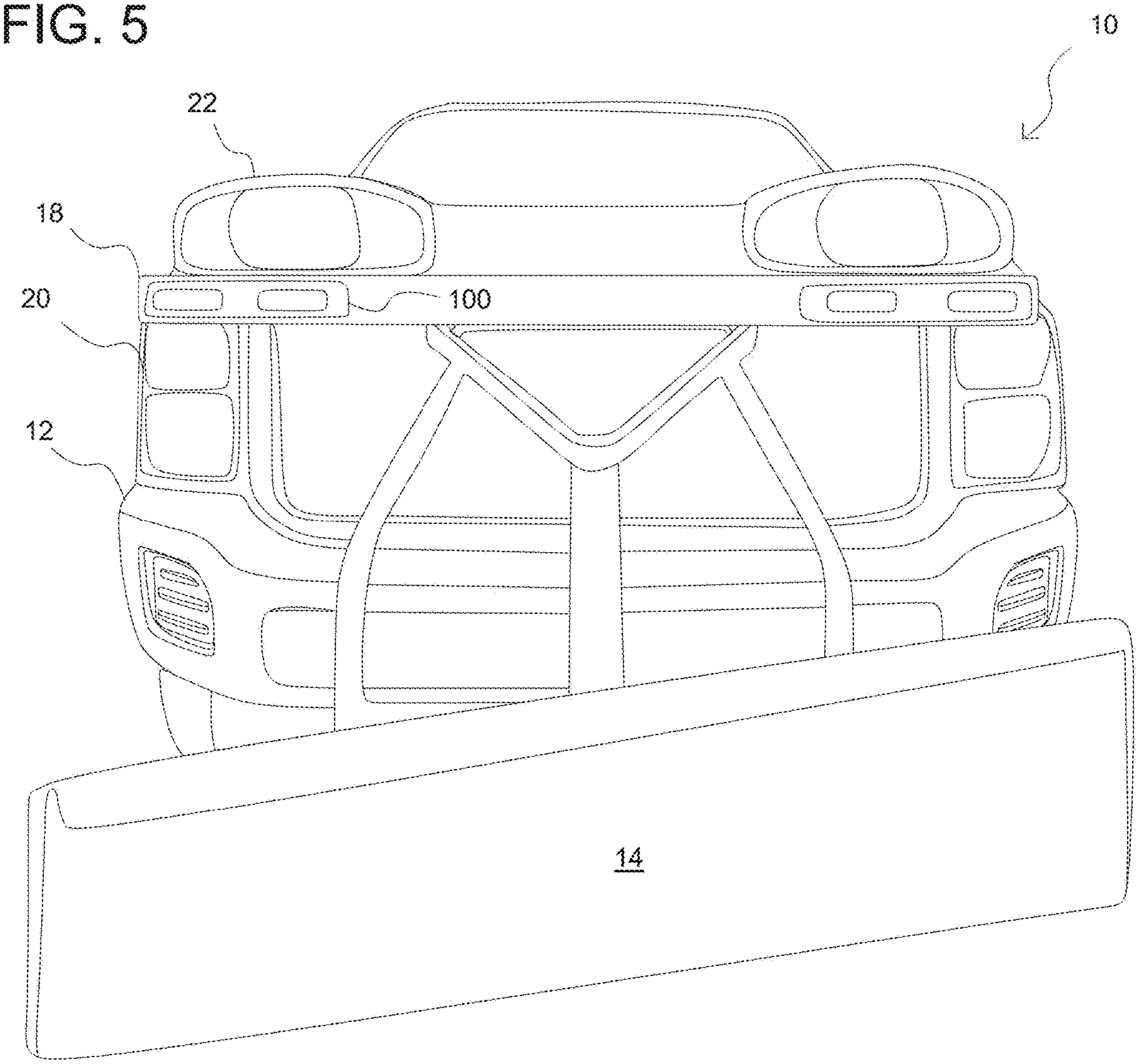
FIG. 5 is an illustration of another embodiment of a safety lighting system according to the present invention with two modules symmetrically mounted, one module mounted under each snowplow lamp.
Figure 6:
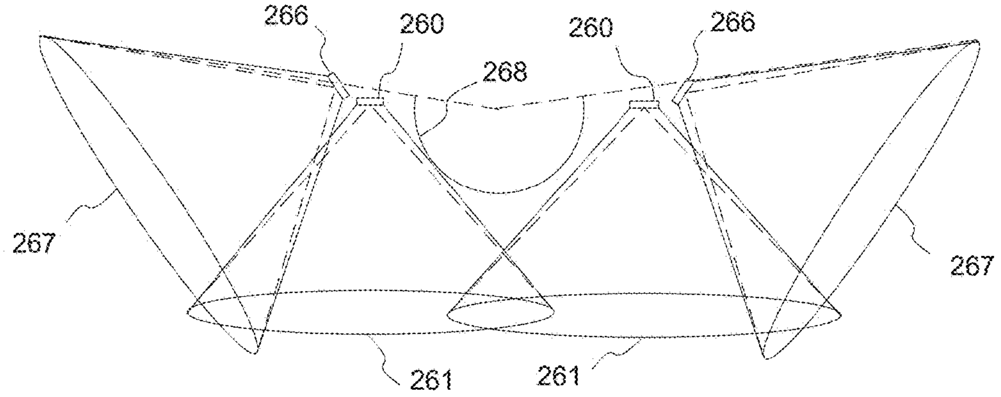
FIG. 6 is a diagrammatic illustration of the improvement of the total light beam angle formed by the safety lighting system according to one embodiment of the present invention as shown in FIG. 5.
Figure 7:
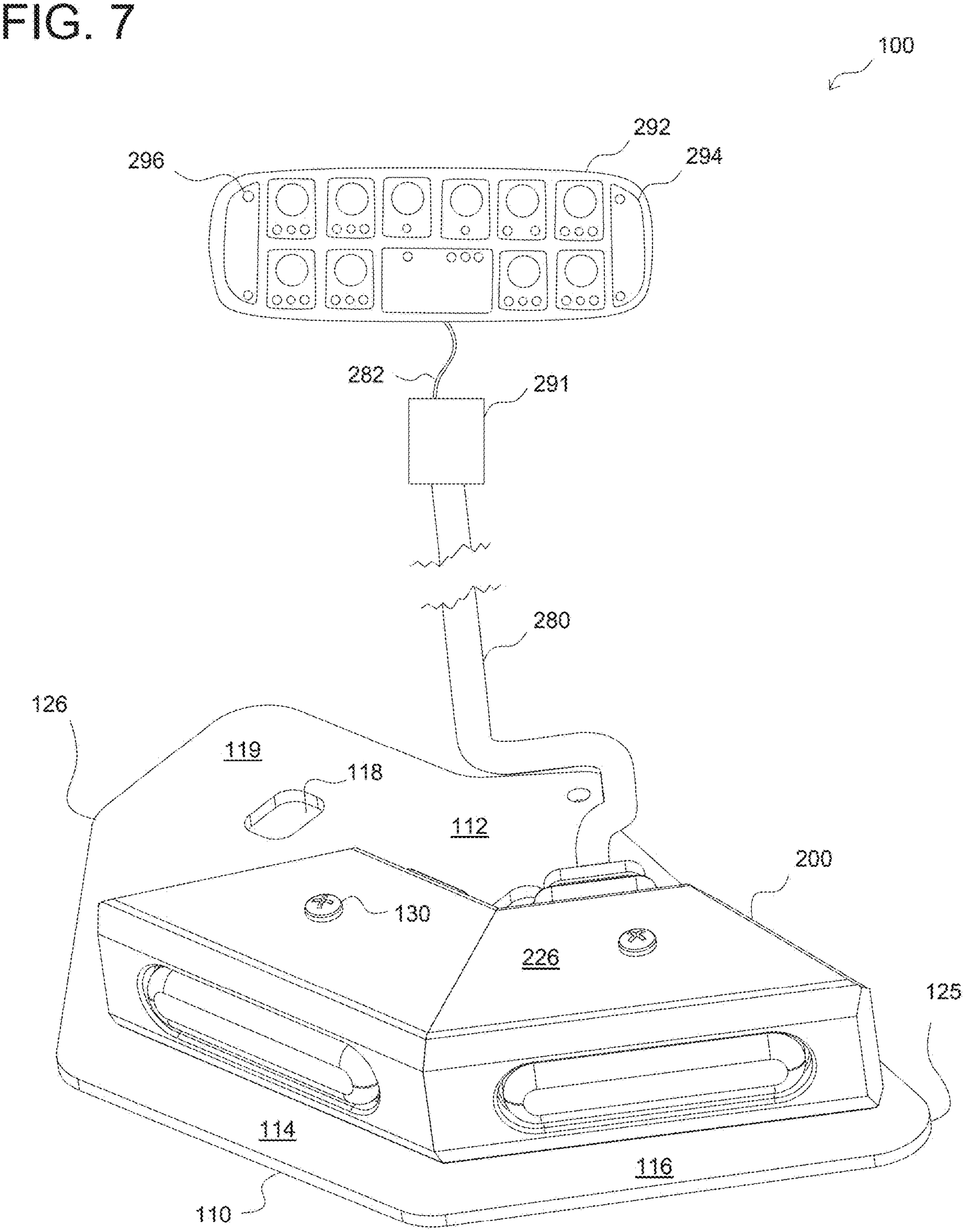
FIG. 7 is a combined front bottom perspective view and diagrammatic illustration of part of the plug and play system shown in FIG. 3.

FIG. 7 illustrates one of the wired controllers according to one embodiment of the present invention that is custom built and pre-programmed. The controller 290 shown here consists of two main components, the relay center 291 and the keypad 292. The relay center 291 houses the brain portion and utilizes a can-bus communication relay 293 between the relay center 291 and keypad 292. The keypad has fourteen buttons 294, two of which are integrated into one larger button in the center. This larger button may be inscribed with a logo.

The buttons 294 are the main controls switches for the entire system 100. At least three switches are provided as auxiliary switches for the end user to be able to control other accessories not from the present invention system 100.

The main system 100 operates in what the present invention calls zones. In this embodiment, there are six available zones to be used with the four provided light head modules 200. Each of these zones allow most major functions to be operated.

The two switches 294 embedded in the larger button allow the end user to change the flash patterns that are embedded in the light heads 260. The relay center 291 comes with a series of mating connectors that mate with the present invention cables.

In other embodiments, the end user could, with knowledge of the trade, use their own connectors to access the use of the system. However, by providing a fully integrated system with controller and wires, the present system 100 is able to expedite the total install time by using plug and play cables and connectors.

Wireless Remote Controller 295

Figure 8:
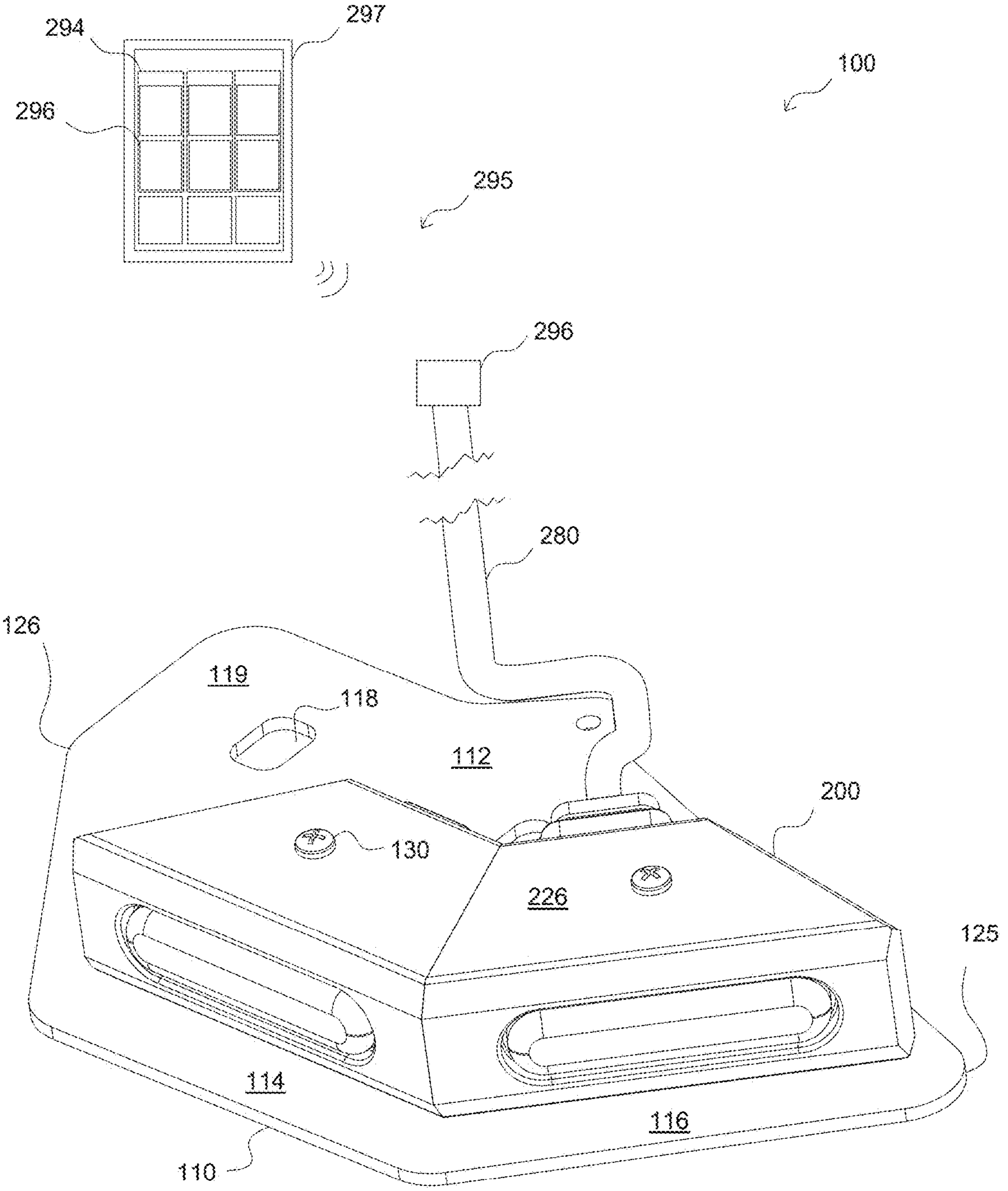
FIG. 8 is a combined front bottom perspective view and diagrammatic illustration of a part of the plug and play system shown in FIG. 5.
Figure 9:
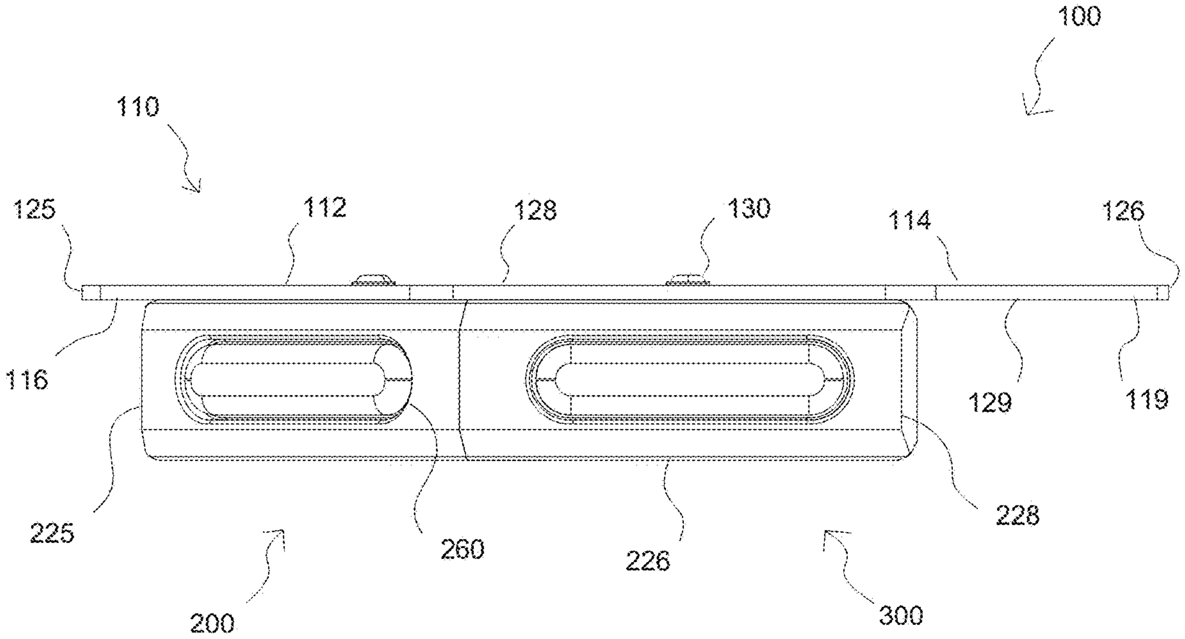
FIG. 9 is a front view of the bracket and module of the plug and play system shown in FIG. 3 (the module and bracket mounted on the right of the truck, and visible on the left side of the page).
Figure 10:
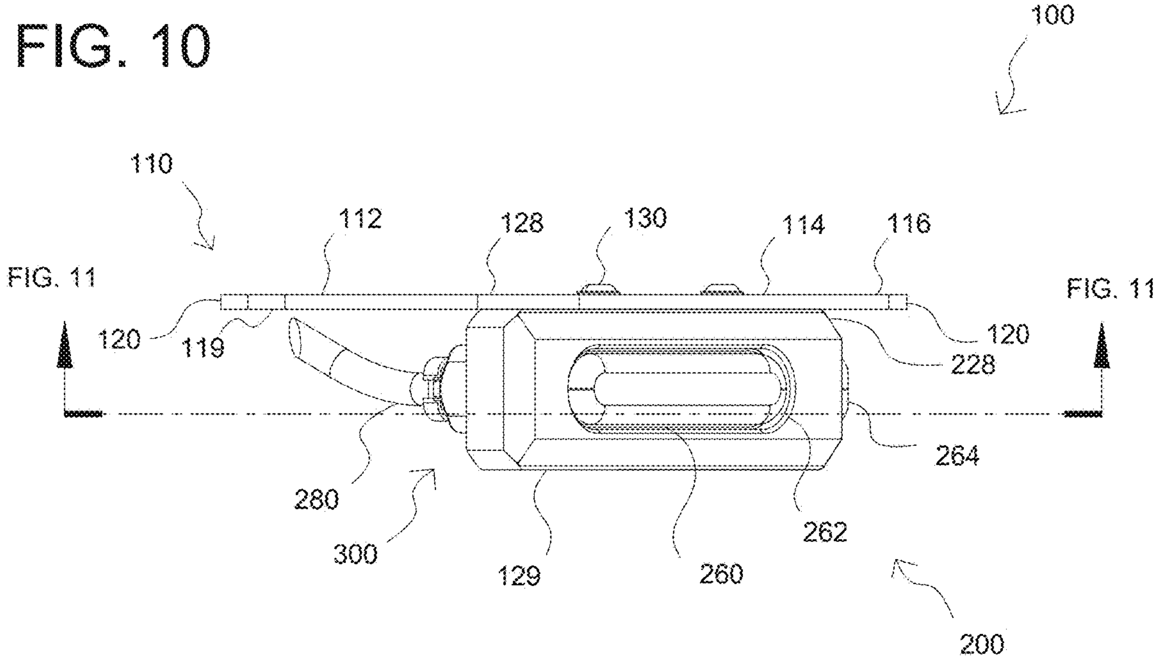
FIG. 10 is an exterior side view of the bracket and module of the plug and play system shown in FIG. 9.
Figure 11:
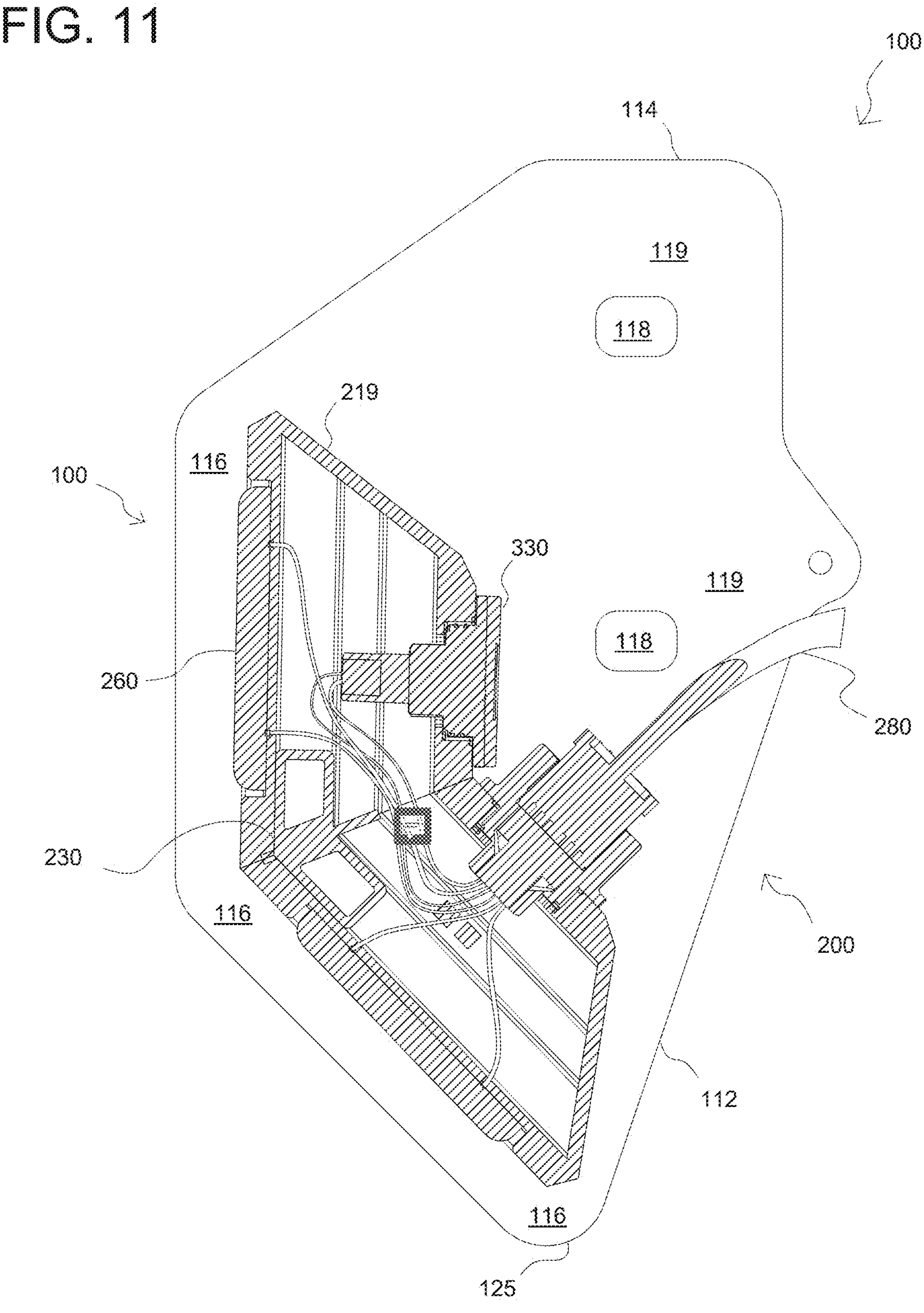
FIG. 11 is a bottom cross-sectional view of the bracket and module of the plug and play system shown in FIG. 9, showing some internal wiring according to one embodiment of the present invention.
Figure 12:
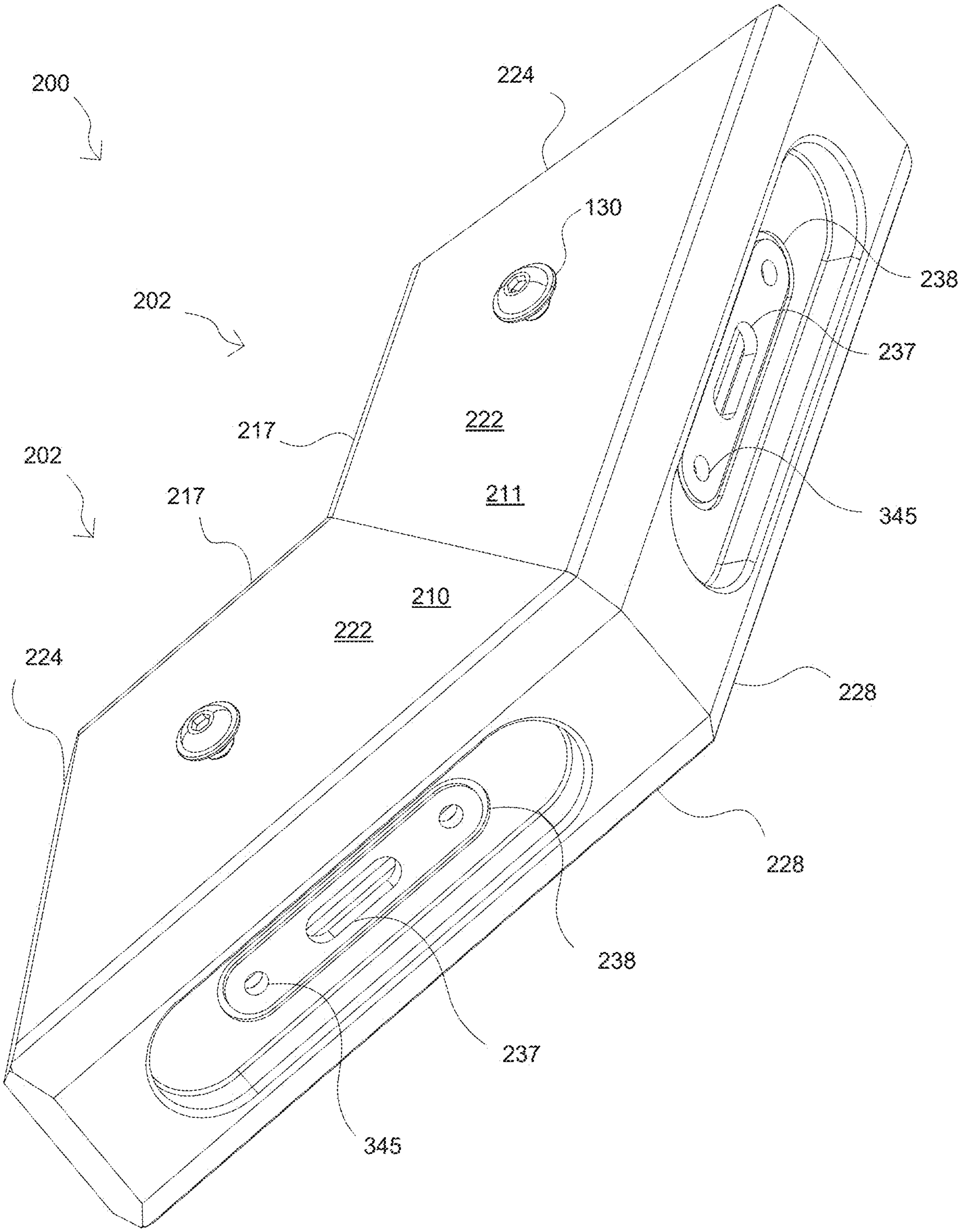
FIG. 12 is a front top perspective view of a module housing according to one embodiment of the present invention.
Figure 13:
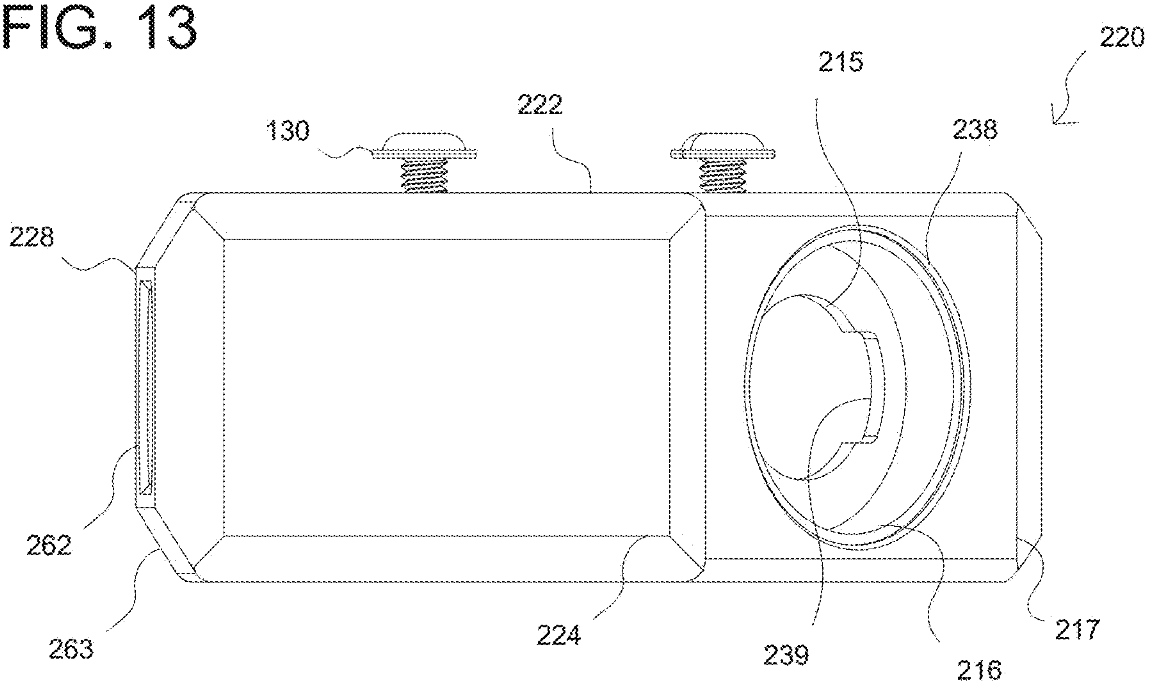
FIG. 13 is a side view of the module housing according to one embodiment of the present invention shown in FIG. 12 (a portion of the rear is visible due to the angled nature of this module).
Figure 14:
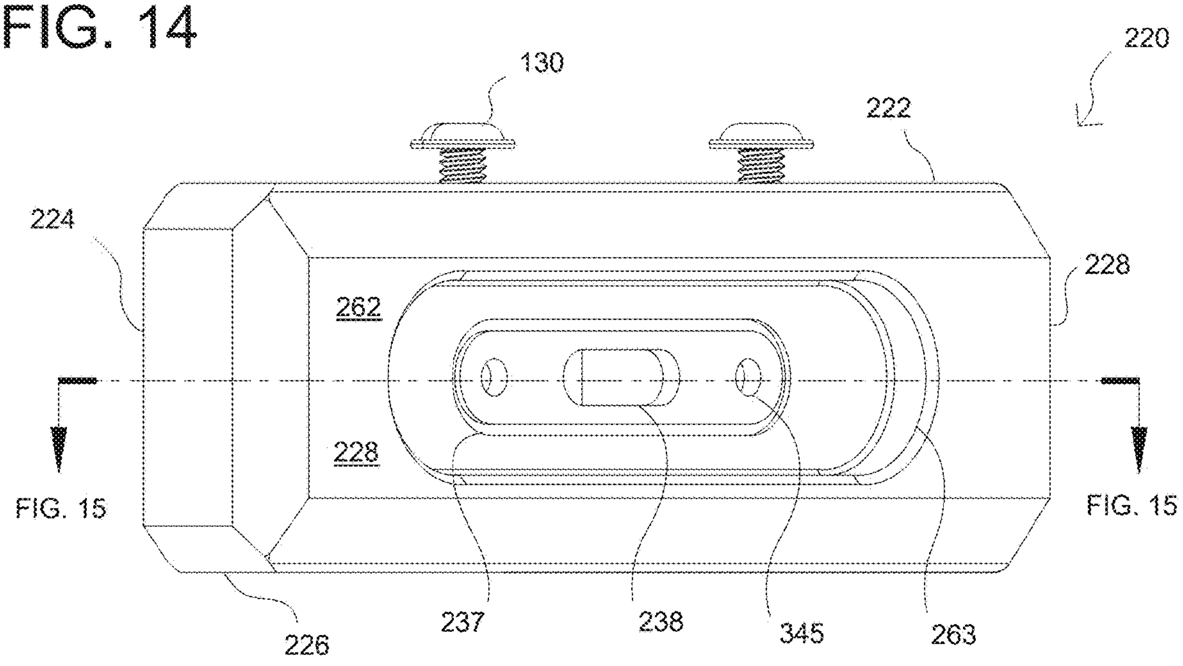
FIG. 14 is a front side view of the module housing according to one embodiment of the present invention shown in FIG. 12.
Figure 15:
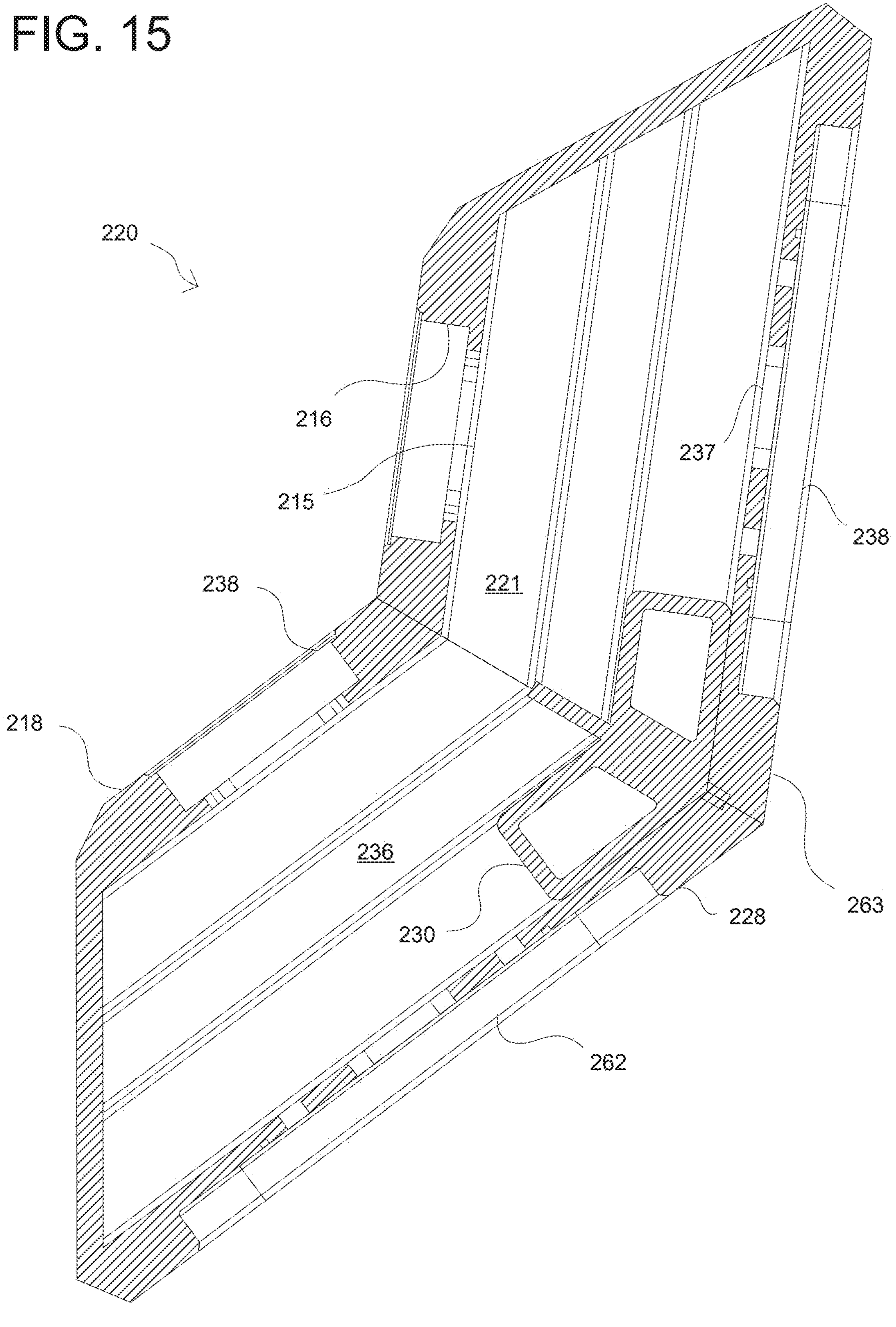
FIG. 15 is a top view (looking down) cross-sectional view of the module housing according to one embodiment of the present invention shown in FIG. 12, according to the view line of FIG. 14.
Figure 16:
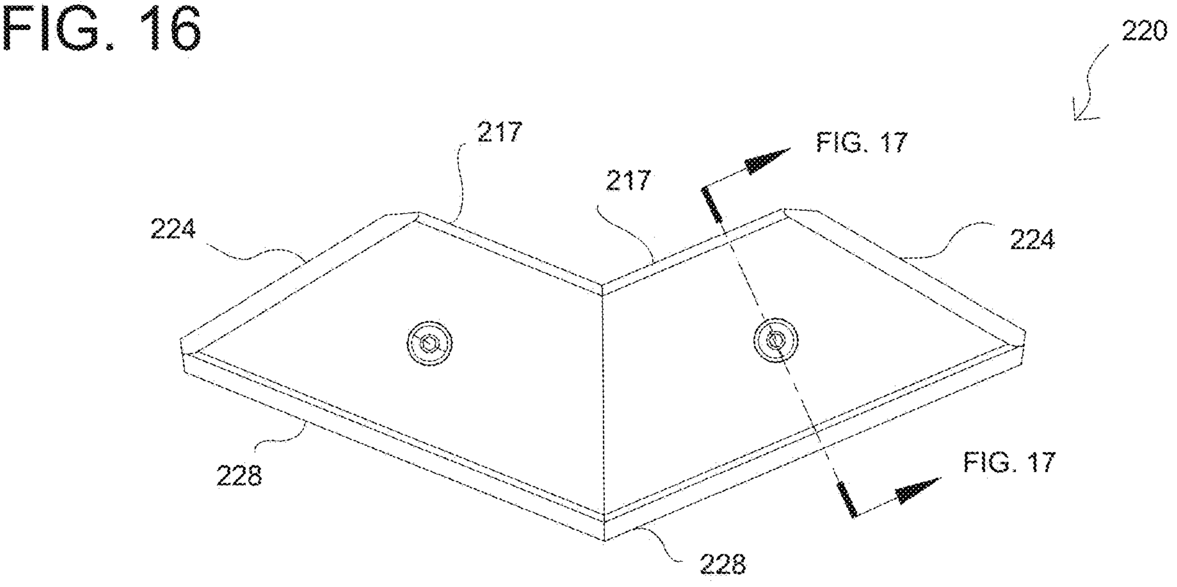
FIG. 16 is a top view of the module housing according to one embodiment of the present invention shown in FIG. 12.
Figure 17:
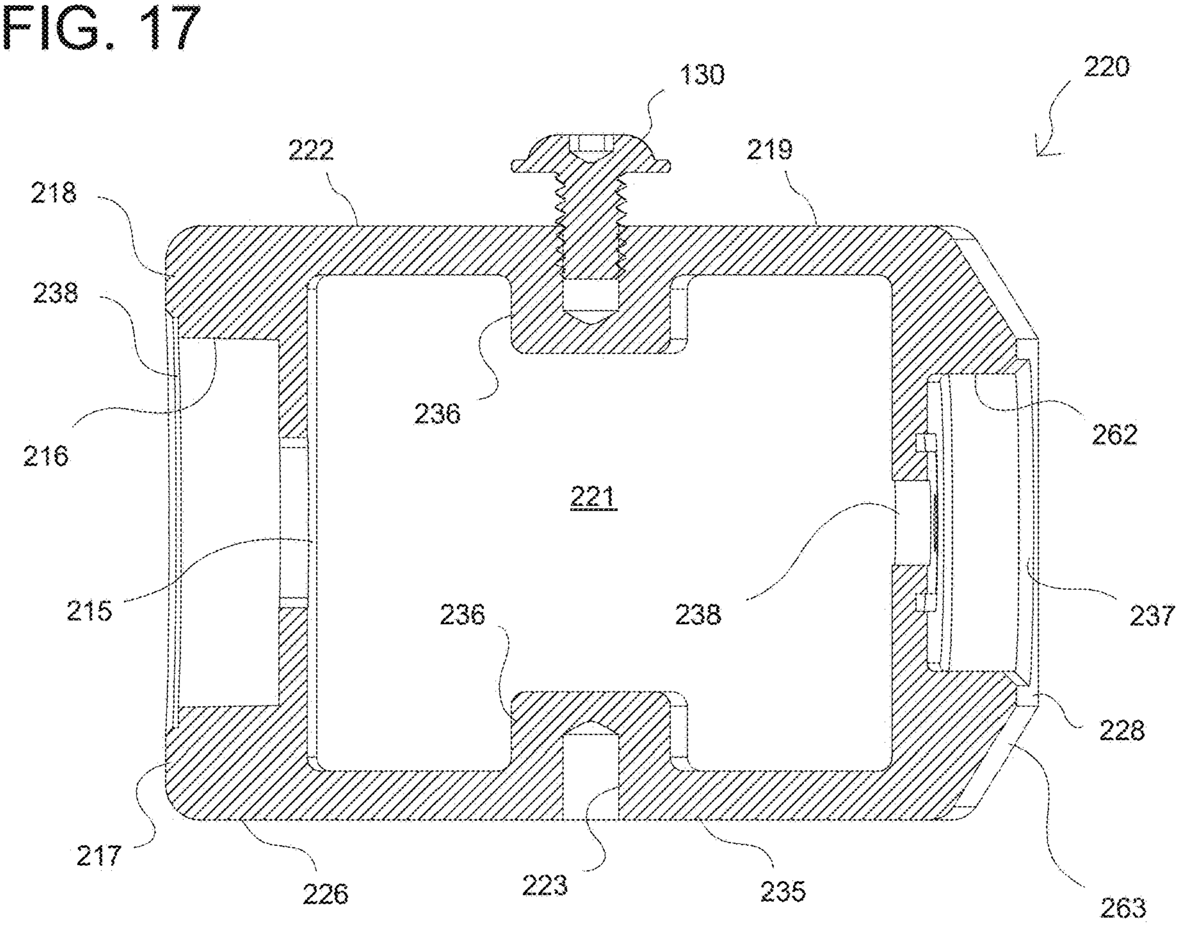
FIG. 17 is a side view (looking out) cross-sectional view of the module housing according to one embodiment of the present invention shown in FIG. 12, according to the view line of FIG. 16.
Figure 18:
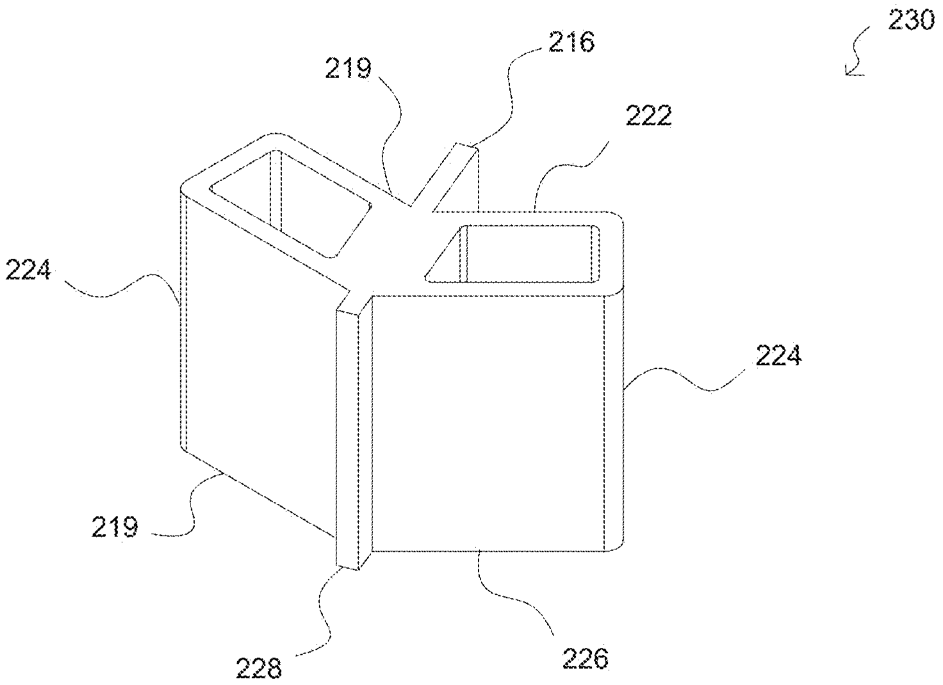
FIG. 18 is a side top front perspective view of the wedge block according to one embodiment of the present invention as shown in FIG. 15.

FIG. 8 illustrates one embodiment of the present invention which uses one of the wireless remote controllers that is custom built and pre-programmed. The wireless controller 295 allows the end user to achieve flexibility that is currently unmatched in the industry. One embodiment of the wireless system 295 according to the present invention is custom built for the present inventive system by CATTRON/BWI Eagle®. The wireless controller system 295 enables the system 100 to operate the present invention LED modules 200 in a similar fashion as the wired controller 290.

The wireless system uses a wireless receiver 296 and transmitter 297. In one embodiment, the receiver 296 and transmitter 297 operate on Bluetooth, enabled through portable cellular devices. In another embodiment, the receiver 296 and transmitter 297 operate on 10-30 volts DC and communicates on a 2.4 mhz frequency that is free to the public to use without special radio licensure. The wireless receiver 296 can be controlled by any compatible transmitter and accomplishes this via a "learning" feature built into the software of the device.

Receivers 296 and transmitters 297 may be provided with the system 100. Alternatively, the end user can simply purchase receivers 296 as a standalone part and then couple them to their transmitters 297 by pressing a button to put them into a learn mode, the receiver will then only listen to the transmitter used to set the feature. Being able to learn the receivers to specific transmitters solves the problem of cross-talk and the potential of receivers acting to commands sent by other transmitters. The receiver can re-learn any transmitter as many times as necessary to be used by different groups of workers or be placed into different zones of use on the transmitters. This feature helps keep the modularity of the system to the maximum potential. When coupled with a rechargeable battery, the wireless system can provide unmatched flexibility in warning lights as well as further reach as the system has a base range of a 600 foot radius.

The wireless system is designed primarily to be used with magnetic mounting brackets 110. The receiver housing can be mounted directly on top of the magnet bracket. The wireless system is ideal for the use in temporary situations such as moving large pieces of heavy equipment over the road, rented equipment where installing wiring is not allowed, or on machinery where the lighting is only needed for a specific task such as snow plowing.

The wireless system is preferably used for remote systems such as the embodiment that provides a telescopic mount for systems such as a traffic control system. The power source for this embodiment for a traffic controller system is designed to be a medium size 12 vdc battery, approximately 60-amp hour size to provide enough run time to last a normal work shift. The battery size can be adjusted by the end user to accommodate more or less time depending on weight and size constraints.

Weather Proofing 300

The present inventive system 100 has several weather proofing subcomponents. The light heads 260 have a high-quality silicone material casing that is resistant to water, dust and other environmental factors that every industry faces on a daily basis, ensuring long-lasting performance and overall reduction in the total cost of ownership. Some embodiments have moldable optical silicone elastomers, ensuring that these lights are capable of meeting the challenging needs on the unforgiving road and unrelenting weather conditions, including the need for high purity, good transmission, optical reflectivity, moisture resistance, and photothermal stability.

The fasteners are capable of withstanding and operating in temperatures in a range of −60° to 190° F.

Heater 330

Part of the weather proofing provided by system 100 is heater 330 which combats the colder weather climates. Heater 330 is capable of keeping the temperature of the entire module 200 above a minimum of 45 degrees Fahrenheit to keep ice from forming in colder climates. The heater 330 has a self-regulating component that allows the heater 330 to be self-regulating, so as not to exceed 75 degrees Fahrenheit.

The ability to generate heat is one of the tough jobs for an LED (light emitting diode). The light generated from conventional light bulbs such as incandescent or halogen is caused by heating the filament to an elevated temperature, enough so that it emits light. The action of heating a filament has the benefit of a lot of energy being wasted as heat, thus keeping the surrounding area relatively warm even in cold climates. With the onset of LEDs the efficiency of the lighting systems has increased tremendously all the while the loss of the extraneous heat generation has created a problem with bulbs used in cold climates, more often than not, snow removal. While most companies add a heated lens over the light assembly to help stop ice formation and snow build up, the idea of having a glass lens in the direct path of impact has been troublesome for several reasons.

The present invention design of the extruded aluminum light module with the incorporated silicone "soft" light heads delivers far superior impact resistance to the system however the light heads still do not generate sufficient heat to keep from having cold weather ice and snow build up which causes significant issues.

The present invention provides a self-regulated heated pad 330 that mounts directly to the opposite side of the module 200 from the brackets. The heated pad will provide enough extra heat to the entire housing 220 to mitigate the issues from ice and snow. When the housing is made of aluminum 220, which is an excellent conductor of heat, the mass of the housing will distribute the heat evenly around the entire case to keep the faces of the lenses clear. However, the open air chamber 221 within the housing 220 also allows the heat to evenly distribute within the entire housing 220 regardless of material.

In most embodiments, the heating pad 330 is provided with the system 100. In these embodiments, the wiring 280 has the wiring for the heating pad built-in so it does not require added labor to run new wires. However, the heating pad 330 can be added by the end users to their system 100 at any point by simply purchasing the heating pads and required relays and installing them to their existing units.

The heating pad is designed for use with wired systems as the current draw would quickly deplete the battery of the wireless unit. The heating element is a thin film of wire embedded in a silicone pad, that allows the surface of the heat element to touch the side of the light module to transfer the heat. The self-regulation is controlled by thermistors 336 contained in the heating pad itself and requires zero outside thermostatic control, when the temperature of the aluminum housing rises to the threshold set by the thermistor 336, it acts like a switch and interrupts the current flow, stopping the heat process, once cooled off by the ambient temperature, the cycle resumes. The heating units are externally fused in the system and are controlled by one of the provided auxiliary switches in the present invention system. The end user has the option to wire the heating units themselves, as long as the safety guidelines are followed.

The heating pad 330 has a cartridge heater 332, thermostat 334, epoxy plug 336, an O-ring seal 338, fasteners 339, and a main body 340. The main body 340 has four integrated segments, a head 342, sealing segment 344, locking segment 346, and column segment 348. The body may be formed from an aluminum billet a solid block of metal. In these embodiments, the machining processes uses milling to remove a shell to form the raw, unshaped metal block into the finished body 340.

The head 342 has a general irregular octagonal shaped face 343 caused by the presence of insert bosses 344 along opposing sides of the face 343. These bosses extend outward from an internal axis of the body 340 on either side of 345? The bosses 344 are protruding features on the body 342 specifically to accommodate the threaded fasteners 349. The holes 345 extend all the way through the bosses 344, allowing the fasteners 349 to securely attach the body 342 to the module 200. This provides a strong mounting point for attaching the body 342 to the module 200 without impacting the overall integrity of the head or body strength overall. The face 343 has a sloped edge 346 along the circumference of the face 343.

The sealing segment 350 extends integrally upwards from the head 342 and is generally a hollow cylindrical shape with an internal cavity 352. In each segment, the cavity 352 extends axially at least through two segments of the: sealing segment 344, locking segment 346, and column segment 348. In some embodiments, the cavity 352 extends through all three segments and even partially extends into the head segment 342. The sealing segment 350 has at least one pathway 354 along an exterior portion. These pathways 354 extend inward along the exterior portion of the sealing segment 350 to support the O-ring seals 338.

The locking segment 360 extends integrally upwards from the sealing segment 350 and is generally a hollow shaft with the internal cavity 352 extending axially therethrough. The diameter of the shaft 364 of the locking segment 360 is less than the diameter of the cylinder of the sealing segment 350.

Narrower yet, the column segment 370 extends integrally upwards from the locking segment 360. The column segment 360 is generally hollow with the internal cavity 352 extending axially therethrough. The internal cavity 352 widens 372 about half-way through the column 360 and ends in an open mouth 374. This facilitates placement of the heating elements 334 and 332 during manufacturing.

After placement of the heating elements 334 and 332 during manufacturing, an epoxy plug is placed into the widened mouth 374. This fills the wider cavity 374, closing the cavity 352 generally, and sealing the elements 334 and 332 within the cavity 352.

Blank Plug Cap 380

Not all systems 100 require a heater 330, and these heaters may be removable for some embodiments. However, it is still necessary to protect the inner portion of the module 200 from detritus. To this end, a blank plug cap 380 is provided with system 100. The blank cap 380 may have additional o-ring seals 338 and a main body 381. The main body 381 of the blank cap 380 has three integrated segments, a head 382, sealing segment 385, and locking segment 390. The body may be formed from an aluminum billet a solid block of metal. In these embodiments, the machining processes uses milling to remove a shell to form the raw, unshaped metal block into the finished body 381. Alternatively, the blank cap 380 may be formed of molded plastics or injection molded nylon 6-6 material.

The head 382 has a general irregular octagonal shaped face 383 caused by the presence of bosses 384 along opposing sides of the face 383. These bosses extend outward from an internal axis of the body 381. The bosses 384 are protruding features on the body 381 specifically to cap the holes in the module for the threaded fasteners 349.

The sealing segment 385 extends integrally upwards from the head 382 and is generally a cylindrical shape. The sealing segment 385 has at least one pathway 387 along an exterior portion. This pathway 387 may extend inward along the exterior portion of the sealing segment 385 to support the O-ring seals 338. The locking segment 390 extends integrally upwards from the sealing segment 385. The diameter of the locking segment 390 is equal to the diameter of the locking segment 360 which is less than the diameter of the cylinder of the sealing segment 350 which is equal to the diameter of the sealing segment 385.

Welding

The modules 200 are cut to the required shape and then assembled in a special fixture. Once the parts are in the fixture, the parts are connected permanently by welding the joints. The welding process can be either TIG (tungsten inert gas GTAW) or MIG (metal inert gas GMAW). The filler wire to be used is alloy 5356 for both processes. The filler wire 5356 is both strong and ductile, it allows the welded part to be machined and then anodized without causing defects in the finished part.

Additional Embodiments

The present invention provides angled modules 200 and straight modules 201. Both the angled and the straight modules have very diverse applications due to the modularity of the system 100 overall. The end user can choose to assemble the available modules into any of the present invention prefabricated brackets that are provided as part of the present system 100, or install modules 200, 201 into custom made brackets they fabricate themselves.

The end user can choose to use the present invention custom designed cable system to provide electrical connections for the complete system or the can choose to provide their own wiring for the components. The end users can choose to use one of the present invention custom design controllers to act as the switching mechanism for the completed system, or they can opt to supply their own switches and or controls. All of these choices add to the modularity of this system. The end user can add the present invention cables, controllers, and modules at any point to expand their existing system, as well as provide needed repairs.

All of the present invention aluminum brackets are designed to be as robust and durable as possible while maintaining reduced weight. The present invention use marine grade (alloy 5052) aluminum that is 7 gauge (0.1875") thick. The present invention design as many mechanical locking features into the brackets as the present invention can to help maintain strength as well as ease of assembly. All of the present invention aluminum brackets are welded with the same alloy as the present invention modules (alloy 5356), this allows us to either anodize or powder coat depending on the application. While the present invention have many current designs for brackets, the present invention are always developing more uses and needs for the modules. All of the present invention steel brackets are made from 7 gauge A36 HRPO (hot rolled, pickled in oil) steel and the stainless versions are made with 7 gauge type 304 stainless steel. The steel brackets are supplied to the end user in bare steel form or an optional primer coating. The stainless-steel brackets are supplied as bare mill finish.

The current modified brackets and modules are created around the current uses the present invention have found for the modules but are not limited by these uses. The following additional embodiments are similar in most respects to the previously discussed embodiment above. Only the distinctions of these embodiments will be further discussed below.

FIG. 30—Safety Lighting System with Vertical Front Universal Assembly

The safety lighting system 100 of this embodiment of the present invention is very similar to that discussed before and uses a single angled module 200 with bracket 110. The bracket 110 still has eaves which extend over the end of the module 200, and mounting portion 114 for mounting the modules 200 onto the bracket 110. However, the attachment portion 112 extends perpendicularly from the mounting portion 114 for an altered positioning of the assembly on a front portion of the vehicle 10.

FIG. 31—System with Eight-Sided Plate and Riser Attachment Assembly

The safety lighting system 100 of this embodiment of the present invention uses four angled modules 200 per bracket 110. The bracket 110 still has eaves which extend over the end of the module, and mounting portion 114 for mounting the modules 200 onto the bracket 110. However, the attachment portion 112 is a riser attachment assembly 112.

The system 100 here may be located in the center of the roof of small construction equipment or the center of the roof/radar arch of a boat. The system 100 provides 360 degrees of warning, work light or a combination of the two. When used on the roof of a piece of construction equipment, the advantage of this system 100 with this bracket 110 and the four angled light modules 200 is the removal of "dark" or less lit areas on the light bar assembly 16.

Typical vehicle light bars 16 have plenty of light facing both forward or backwards in relation to the vehicle 10, however the off angle or side facing lights are minimal. When used in the marine environment, typical light bars 16 tend to not last due to the corrosive nature of the salt air infiltrating the housing and causing damaging corrosion.

Contrary to the prior art versions, this 8-sided system having a bracket 110 coupled with the sealed and highly corrosion resistant light modules 200 will help to solve the current problems surrounding light bars 16 used in the marine environment. The geometry of the 8-sided bracket 110 allows the four light modules 200 to be aligned in such a fashion that two of the LED light heads 260 will be set to the correct angle required by the U.S. Coast Guard rules for navigation lighting. The LED light heads 260 for these systems 100 are available in 5 colors, Red, Green, Blue Amber and White. Each light head can contain up to 3 of these colors separately, therefore allowing the two light heads aligned with the USCG navigation requirements to contain red and green diodes for the application of navigation lights.

The required angle for navigation lights is 135 degrees from the center of the bow back towards the stern, the zone on the vessel's left (port) is to be red and the one on the right (starboard) is to be green. These brackets are available with a specialized mounting plate for the attachment to round tubing that would be typically found on a boat such as a radar arch; this specialized mount plate uses 2 fiberglass reinforced plastic (FRP) U bolts to attach it to the structure. The FRP U bolts have a shear strength of 110 lbs. Which is sufficient to hold the unit steady during normal use while allowing for the breakaway action when contacted by an obstruction such as a tree limb, being able to breakaway in this way helps from causing further damage to the vessel's structure during an accidental collision with low hanging limbs or anything similar. This bracket allows for the addition of an antenna 140 or similar type accessories to be mounted to the top plate, this helps to keep the surrounding area clear of obstructions.

FIG. 32—Safety Lighting System with Utility Access Handle

This embodiment of the safety lighting system 100 according to the present invention has a bracket 110 bracket that incorporates a grab handle 160. The grab handle 160 of the bracket 110 is located just above the module mounting area 114. This bracket can be mounted directly to the top side of a work vehicle 10. Then integrated handle 160 would allow the end user to have a way to safely grab onto the vehicle when entering the rear area while allowing the light module 200 to be situated so as to maximize light output.

The system 100 may also be used in conjunction with a further 90-degree adapter brace. The 90-degree adapter would allow mounting the handle bracket to the vertical face of the vehicle's work area and still maintains the handle 160 for safely holding on as well as keeping the light at a position to maximize the output.

FIG. 33, 34—Safety Lighting System for Flatbed Style Truck Stop Light

The safety lighting system 100 of this embodiment of the present invention is very similar to that discussed before and uses a single angled module 200 with bracket 110. The bracket 110 still has eaves which extend over the end of the module 200, and mounting portion 114 for mounting the modules 200 onto the bracket 110. However, the attachment portion 112 is a flange extending at an angle from the mounting portion 114. This facilitates enabling the attachment portion 112 to attach directly adjacent to the factory stop, tail & turn lights that are typically supplied on commercial vehicles when using flatbed style bodies, cargo boxes, lumber haulers. These brackets 110 have a bolt pattern that aligns with the standard three bolt triangle pattern on the typical lights provided on commercial vehicles. These brackets 110 also have an optional adapter available that allows the end user to replace the factory supplied mount with a more robust steel mount so as to help hold the whole assembly secure.

FIGS. 35-37: System for Dump Truck Cab Shield Mount Plate

The safety lighting system 100 of this embodiment of the present invention is very similar to that discussed before and uses a single angled module 200 with bracket 110. The bracket 110 still has eaves which extend over the end of the module 200, and mounting portion 114 for mounting the modules 200 onto the bracket 110. However, the bracket 110 has an attachment portion which mounts to the underside of a dump truck's cab shield, the part of the dump body that protrudes over the truck's cab to protect the cab from getting hit with material while being loaded. This area has long been a problem spot for light mounting due to the nature of the cab shield design, the shield are typically fabricated on an angle to promote material sliding back into the body, while this is good for the operation of the dump body it hinders the ability to mount any sort of lighting to the area. the present invention bracket mounts with an extruded aluminum hinge that can be bolted directly and securely to the cab shield and the module mounting plate. The action of having a hinge style mount mitigates the issues with regard to the sloping angle of the cab shield and the need to have the LED light heads facing straight out to be effective.

FIG. 38-40: Magnetic Adapter Mounting Plate

The safety lighting system 100 of this embodiment of the present invention is very similar to that discussed before and uses a single angled module 200 with bracket 110. The bracket 110 still has eaves which extend over the end of the module 200, and mounting portion 114 for mounting the modules 200 onto the bracket 110. However, the bracket 110 is designed to further the intended modularity of the whole system by allowing a single light module to be temporarily mounted to any steel surface as needed. This bracket incorporates the use of at least two magnet devices made by Magswitch® which are capable of being turned off and on with a mechanical switch located on the top of the magnet assembly. The ability to turn off the magnet is helpful when transporting the magnetic bracket assemblies while not in use by keeping the magnets from sticking to unwanted areas, or even small items such as wrenches or similar tools. Being able to place the magnets on the target and then affix them by turning a lever mitigates the problem and potential dangers of strong magnets pitching the users hands or causing damage by sliding the magnets along a painted surface to further position them. The magnets used for this bracket have an integral loop that acts as a tether hook, the use of a tether reduces the chances of the magnetic assembly falling and causing property damage or bodily injury. The magnet bracket system was designed to be used mainly with heavy equipment where the use of a specially fabricated bracket can be difficult to install or used as a temporary mount for such uses as when transporting large steel weldments like bridge beams over the roads. The magnet bracket can be used with a conventionally wired system whereas the control cables are run to the location of the bracket or it can be used with a wireless system that requires just a simple dc power source or even the use of a small rechargeable battery.

FIG. 41, 42: Safety Lighting System for Truck Headache Rack Mount Plate

The safety lighting system 100 of this embodiment of the present invention is very similar to that discussed before and uses a single angled module 200 with bracket 110. The bracket 110 still has eaves which extend over the end of the module 200, and mounting portion 114 for mounting the modules 200 onto the bracket 110. However, the bracket 110 is designed to mount to any type of headache rack on commercial trucks as well as pick up trucks. The headache rack is a common term for the rack that is located directly behind the cab of a pick up, flatbed or semi tractor, the rack prevents the load in or on the back of the truck from entering the cab area in the event of an accident or sudden load shift. These types of racks are commonly used to help carry certain loads that may be too long for the bed area. One example of the use is when long boards or a ladder is carried in a pickup truck, the driver may extend the load up onto the headache rack and use it to help secure the load. Typical light bar installations tend to prohibit this use of the rack as they are usually mounted to the center of the rack therefore preventing anything else to be placed there without damage to the light bar. the present invention bracket design for this application solves this problem by providing rugged brackets that can be used with or without the optional risers and are placed at the extents of the headache rack. Placing the brackets at the outer extents of the headache rack allow the center of the rack to be used to place longer loads as well as the brackets can be used to help support light loads such as ladders or smaller size lengths of lumber from shifting off the sides of the rack.

FIG. 43, 44—Straight Module

The straight module is comprised of the same extrusions as described above for the angled module less the internal angled locking extrusion. The straight module is cut to a length of 12 inches with the ends mitered at 37 degrees, this allows the same end caps to be used as well as the benefits of having the acute angle for clearance and alignment. The straight module has two four inch LED light heads on the face, the same as the angled module. The straight module has two electrical ports the same as the angled module, and the same turn-to-lock style cam-lock geometry.

The straight module has an added benefit of a rectangular side that can be machined to accept an additional port for an additional LED light head on one or both sides. The present invention can machine a receptacle into the flat side of the straight module that will provide an attachment point for a LED light head bezel, both of which include the above-described O-ring seals.

When the straight module has a perpendicularly aligned LED light head, it can be beneficial for providing warning light or work light directly to the side of the area where the module is affixed. One example of this benefit is on the rear of large trucks used for hauling material or snow removal, having the straight module affixed in a bracket with the main two LED light heads facing towards the rear of the truck, the side outlet LED light head will provide extra warning or work light to the side of the vehicle, without this extra light the chances of not being seen in darkness or inclement weather are greatly increased.

While the mounting hole center to center distance is different on the straight module than the angled module, the housing vertical cross-sectional shape is the same. This enables the system capable of providing customized sets with "mix and match" straights and angled modules to achieve just about any configuration required by the end user.

This bracket was designed to be cut and welded into the rear of a dump truck body. The bracket has provisions to be mounted to the side in the event it can not be fitted into the body. This bracket is one that is offered in 3 different materials, steel, aluminum and stainless steel depending on the end user's needs. These bucket style brackets further protect the light module and cabling required by way of fully encapsulating the light module. The bracket has provisions on the side for the optional perpendicular side light if needed.

LIST OF REFERENCED ELEMENTS

The following reference numbers are adhered to within the specification to refer to those referenced elements within the drawings of the present application.

- truck 10
- front of truck 11
- side of truck 12
- plow 14
- frame 16
- bolt 18
- headlights 20
- spread of truck 21
- plow lights 22 spread of plow 23
spread, total 25
beam spread 30
system 100
bracket 110
attachment portion 112
mounting portion 114
eaves 116
apertures 118
margins 119
front 120
rear 122
outer rear side 124
outer front side 125
inner front side 126
top 128
bottom 129
fasteners 130
module 200
straight module 201
half module 202
finishing coat 210
seal 211
orifice 215
receptacle 216
rear 217
load bearing walls 218
walls 219
housing 220
chamber 221
top 222
pockets-blind hole 223
side 224
exterior side 225
bottom 226
front 228
end cap 229
wedge 230
coat 235
projection 236
slot 237
pathway 238
notch 239
connector 240
body 241
head 242
face 243
bosses 244
edge 245
sealing segment 246
pathway 247
locking segment 248
cam lock 249
shaft 250
outlet segment 251
overlayer 252
hollow 253
pins 254
side release clasp 255
coupler 256
wedgelock 257
side release buckles 258
light heads 260
beam 261
inset 262
protrusion 263
protrusion 263
bubble 264
chamfer 265
angled light head 266
angled beam 267
total beam 268
wiring system 280
heat relay 281
can-bus communication relay 282
to heating element 283
to lights 284
controller 290
relay center 291
keypad 292
can-bus communication relay 293
buttons 294
wireless controller 295
receiver 296
transmitter 297
weather proofing 300
silicon seal 310
o-ring 320
heater 330
cartridge heater 332
thermostat 334
epoxy plug 336
o-ring seal 338
screws 339
body 340
head 342
face 343
bosses 344
hole 345
holes 345
edge 346
sealing segment 350
cavity 352
pathway 354
locking segment 360
cam lock 362
shaft 364
column segment 370
blank cap 380
body 381
head 382
face 383
bosses 384
sealing segment 385
edge 386
pathway 387
locking segment 390
cam lock 392
shaft 394

CONCLUSION

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A safety lighting system capable of attachment to a frame of a vehicle, the system comprising:

a module comprising:

at least one light head, at least one electrical plug, a wiring assembly, a weatherproofing assembly, and a housing with an internal hollow chamber, wherein the housing enclosing portions of the at least one light head, the at least one electrical plug, the wiring assembly, and the weatherproofing assembly; and wherein the housing comprising a receptacle for supporting the at least one electrical plug;

wherein the at least one electrical plug comprises a head segment, a sealing segment, and a locking segment for reversible locking engagement with the receptacle of the housing; and wherein the at least one electrical plug further comprises a column segment for supporting an internal cartridge heater and thermostat.

2. The safety lighting system of claim 1 wherein the receptacle of the housing is formed in a rear portion of a load bearing rear wall of the housing; and an orifice with two opposing notches is formed within the receptacle.

3. The safety lighting system of claim 1 wherein the locking segment of the at least one electrical plug has a shaft with two extending cam locks for locking engagement with an orifice having two opposing notches within the receptacle of the housing.

4. The safety lighting system of claim 1 wherein the locking segment of the at least one electrical plug has a shaft with two extending cam locks for reversible locking engagement with the two opposing notches within the receptacle of the housing.

5. The safety lighting system of claim 1 wherein the sealing segment of the at least one electrical plug has a pathway for supporting an o-ring seal for reversible sealing engagement with walls of the receptacle of the housing.

6. The safety lighting system of claim 1 wherein the at least one electrical plug further comprises an outlet segment extending from the head segment, the outlet segment having a hollow with electrical pins for connecting with an electrical coupler.

7. The safety lighting system of claim 1 wherein, upon installation the head segment abuts against an external portion of a wall of the housing, the sealing segment extending from the head segment and being positioned within the receptacle of the housing, and the locking segment extending from the sealing segment.

8. The safety lighting system of claim 1, wherein the housing have walls with a first thickness and load bearing walls with a second thickness, and the second thickness being greater than the first thickness.

9. The safety lighting system of claim 1, wherein a front of the housing has load bearing walls with an inset for supporting the at least one light head; wherein the inset having a pathway for supporting an o-ring seal for reversible sealing engagement with the load bearing walls of the inset of the housing.

10. The safety lighting system of claim 1, wherein a wall of the housing has external pockets and an integral projection, the integral projection extending into the chamber of the housing, supporting the external pockets, and blocking the pockets from extending into the chamber of the housing.

11. The safety lighting system of claim 1 further comprising a mounting bracket for reversibly affixing the module to the frame of the vehicle.

12. The safety lighting system of claim 11 wherein the mounting bracket for reversibly affixing the module to the frame of the vehicle having a mounting portion for mounting the module and an attachment portion for attachment to the frame.

13. The safety lighting system of claim 11 wherein the at least one electrical plug is chosen from a group consisting of a blank plug, a connector plug, and a heat plug.

14. The safety lighting system of claim 1 further comprising a controller capable of providing instructions for at least two safety or hazard light settings to the at least one light head.

15. A customizable modular safety lighting system capable of plug-and-play attachment to a frame of a vehicle in an external environment with dust and water, the system comprising:

a module comprising:

at least one light head, at least one electrical plug, a wiring assembly, a weatherproofing assembly, and a housing with an internal hollow chamber, wherein the housing enclosing majority portions of the at least one light head, the at least one electrical plug, the wiring assembly, and the weatherproofing assembly;

a controller capable of providing instructions for at least two safety or hazard light settings to the at least one light head; and a mounting bracket for reversibly affixing the module to the frame of the vehicle; and wherein the housing comprising an inset for supporting the at least one light head;

wherein the housing comprising a receptacle for supporting the at least one electrical plug;

wherein the at least one electrical plug is chosen from a group consisting of a blank plug, a connector plug, and a heat plug;

wherein the at least one electrical plug comprises a head segment, a sealing segment, and a locking segment for reversible locking engagement with the receptacle of the housing; and wherein the weatherproofing assembly facilitates in sealing the internal hollow chamber from the external environment, preventing entry of dust or water into the internal hollow chamber.

* * * * *